United States Patent
Melo Mundaca et al.

(10) Patent No.: US 10,633,751 B2
(45) Date of Patent: Apr. 28, 2020

(54) DIRECT ELECTROWINNING PROCESS WITH LEACHING SOLUTION

(71) Applicants: Proter S.A., Santiago (CL); Ewtech Investigación Desarrollo e Innovación S.p.A., Santiago (CL)

(72) Inventors: María Angélica Melo Mundaca, Santiago (CL); Paulina Godoy Melo, Santiago (CL); Orlando Godoy Olguïn, Santiago (CL)

(73) Assignees: Proter S.p.A., Santiago (CL); Ewtech Investigaciín Desarrollo e Innovación S.p.A., Santiago (CL)

( * ) Notice: Subject to any disclaimer, the term of this patent is extended or adjusted under 35 U.S.C. 154(b) by 162 days.

(21) Appl. No.: 15/531,360

(22) PCT Filed: Nov. 28, 2014

(86) PCT No.: PCT/CL2014/000066
§ 371 (c)(1),
(2) Date: May 26, 2017

(87) PCT Pub. No.: WO2016/082051
PCT Pub. Date: Jun. 2, 2016

(65) Prior Publication Data
US 2017/0327962 A1 Nov. 16, 2017

(51) Int. Cl.
*C25C 1/00* (2006.01)
*C25C 5/02* (2006.01)
*C25C 7/00* (2006.01)
*C25C 1/12* (2006.01)
*C25C 7/06* (2006.01)
*C25C 7/02* (2006.01)
*C22B 15/00* (2006.01)
*C22B 3/04* (2006.01)

(52) U.S. Cl.
CPC ................ *C25C 1/12* (2013.01); *C22B 3/045* (2013.01); *C22B 15/0008* (2013.01); *C22B 15/0071* (2013.01); *C25C 7/02* (2013.01); *C25C 7/06* (2013.01); *Y02P 10/236* (2015.11)

(58) Field of Classification Search
CPC ........ Y02P 10/234; Y02P 10/212; C25C 1/12; C25C 1/00; C25C 5/02; C25C 7/06; C25C 7/00
See application file for complete search history.

(56) References Cited

U.S. PATENT DOCUMENTS 4,786,384 A 11/1988 Gerhardt et al.
2006/0016696 A1 1/2006 Stevens et al.

FOREIGN PATENT DOCUMENTS

EP 2351874 B1 2/2013
WO 2006049631 A2 5/2006
WO 2013117805 A1 8/2013

*Primary Examiner* — Zulmariam Mendez
(74) *Attorney, Agent, or Firm* — Wood Herron & Evans LLP

(57) ABSTRACT

The invention relates to a process that allows electrolytic copper cathodes to be produced, using the pregnant leach solution (PLS) directly in the electrowinning, avoiding the step of mineral concentration by solvent extraction. Furthermore, this process has a modular structure and the full process can be mobilised depending on the requirements of the process itself. The invention also relates to the system that operates with the previously described process.

13 Claims, 13 Drawing Sheets

DIRECT ELECTROWINNING PROCESS WITH LEACHING SOLUTION

TECHNICAL FIELD OF THE INVENTION

The technical field of this invention refers to mining, specifically processes of hydrometallurgy, electrowinning and/or electrorefining.

BACKGROUND OF THE INVENTION

Obtaining copper cathodes on a large scale is a process known in the state of the art. This process, to be profitable, is intensive for large volumes of material to be obtained. The basis of this process is one used for the first time in south Wales in 1869, where electrorefining was tested as a purification process for metallic copper that is carried out in electrolytic cells and consists of the application of an electric current to dissolve impure copper. In this way, the purest possible electrolytic copper is obtained, with 99.99% purity, which permits its utilization as an electric conductor, among other applications. Chile is one of the principle producers and refiners of copper in the world.

The total process for the obtaining of electro-refined copper is known by the technicians in this subject (FIG. 1 above) and operates as follows:

Crushing: at this stage, the material extracted is reduced to ever smaller and more compact portions.

Lixiviation (LX), metallurgical technique that consists of watering the heaps of mineralized material with a solution of water with sulfuric acid, dissolving the copper content in the oxidized minerals and forming a copper sulfate solution, which is taken to the PLS (pregnant leaching solution) pools.

Extraction by solvent (SX), is a method of separation of one or more substances of a mixture by means of the use of solvents, obtaining a solution that is rich in copper.

Electrowinning (EW), is a process whereby the copper solution (electrolyte) is taken to the electrowinning premises where there are a series of cells placed in such a way that when a current is applied to them the copper sulfate solution decomposes, and the copper remains adhered to the cathodes. (As can be seen in FIG. 9.)

Copper cathode, these are copper plates that are obtained in the electrowinning process.

The stages presented previously, in that order, reveal the process that is known. Each one of the stages, individually, has its own technical problems of which we want to emphasize those that are presented below.

This type of hydrometallurgy, electrowinning and/or electrorefining processes have always been executed at a fixed location due to the large number of equipment, electrical support, intensive process and management of high tonnages of material that this operation requires.

In general, the electrolytic extraction processes are carried out in undivided electrochemical cells that contain an electrolytic bath and a multiplicity of anodes and cathodes. In these processes, such as, for example, the electrodeposition of copper, the electrochemical reaction that takes place in the cathode (manufactured of stainless steel), conducts the deposition of copper in metallic form on the cathode itself. The anode, generally manufactured of lead, is consumed slowly forming the anodic sludges and producing gaseous oxygen, as residual elements (WO2013/060786).

In general, what is known by the state of the art mentions that this type of process uses continuous current in parallel through each anode-cathode pair, as mentioned in patent WO 2013117805. In fact, rectifiers are used to compensate the system's direct current input with the current the electrochemical process on its own requires.

Another of the common stages of the total process in electrowinning, but prior to subjecting the electrolyte to the current, is the ore enrichment or concentration stage by extraction of same with solvents, a stage also called Pregnant Leach Solution (PLS). This stage is necessary to reach a copper concentration in the electrolyte of about 7 to 48 g/L of electrolyte. These concentrations are necessary to make the electrowinning process economically viable in medium and large-scale mining.

SUMMARY OF THE INVENTION

In a first aspect of this invention, it is a process that permits the obtaining of cathodes of electrolytic copper using the pregnant leach solution (PLS) directly in the electrowinning, avoiding the stage of ore concentration by extraction with solvents (FIG. 1).

A second aspect of this invention is that the process it set up in modular form and the whole process can be mobilized depending on the demand of the process itself.

A third aspect of this invention involves the current with which the electrolyte dissolved in the electrowinning is dissolved, in such a way that in this invention it behaves like a circuit of continuous current in series and not in parallel as it is executed at present.

A fourth aspect of this invention allows this process to work with larger volumes of a strong lixiviation solution and with smaller concentrations of dissolved copper. The volumes of the operating flow are about 3 to 5 times larger than the process that is normally used today.

A fifth aspect of this invention presents the system in which the above-described processes (crushing and lixiviation) are carried out where the PLS product passes directly to the electrowinning without passing through a stage of extraction by solvents (SX), reducing production times, saving reagents and stages, finally permitting the production of top quality cathodes.

A sixth aspect of this invention is to achieve a high velocity of mass transference towards the cathode with a low specific surface of same ($m^2$/kg of cathode), with low concentrations of copper and high incoming flows in the cell.

A seventh aspect is to use a low continuous current in the cell with a lower energy consumption (increasing current efficiency in 99%) because the traditional processes use a high continuous current, making its influence felt in a high-energy consumption.

An eighth aspect is that the consumption of electric current becomes independent of the number of cathodes and anodes.

Finally, the EW-LED process produces a big impact on small and medium-sized mining because of the low investment and operation cost that these plants require and being able to outsource a process that adapts to the production process they possess because it is modular.

The technical problems this process hopes to resolve are:

How to obtain copper cathodes with electrolytic quality based on a saturated lixiviation solution or pregnant leach solution (PLS), without passing through the step of concentration by extraction using solvents (SX), How to obtain that the continuous current of the electric power system is exactly the same as the current that the electrochemical process requires for electrowinning copper cathodes, that is, the electrowinning process is a circuit of continuous current in series.

How to electro-win copper directly from an ore lixiviation solution with a low concentration of copper.

How to make use of an intensive electrowinning process where it is required (physically), for the amounts that it is required for and in the shortest possible time and likewise, the plant can be moved when the work site no longer requires its services.

How to obtain a high velocity mass transference towards the cathode with a low specific surface of the same ($m^2$/kg of cathode), with low concentrations of copper and high incoming flows in the cell.

How to use a low continuous current in the cell with a lower energy consumption (increasing current efficiency in 99%) because the traditional processes use a high continuous current, making its influence felt in a high-energy consumption.

How does the consumption of electric current become independent of the number of cathodes and anodes?

DETAILED DESCRIPTION OF THE INVENTION

The productive process of obtaining copper cathodes begins based on the irrigation of ore pads, where the material is processed previously through an agglomeration stage and subsequently is transported and heaped in an additional pad for this purpose, in the lixiviation (LX) area.

These pads are watered with a raffinate solution that originates in the spent solutions of the EW cells and then with a recirculated solution of ILS that is formed based on the lixiviation solutions with a low concentration of copper, process water and in addition to the adding of sulfuric acid that the process requires for its progressive enrichment in copper, which is then sent to the electrowinning (EW) area in PLS category.

In this area, the PLS solution is conditioned on line, with the addition and replenishment of the anodic and cathodic additives (cobalt sulfate and guar), reagents (sulfuric acid) and processing water. Prior to entering the EW, the solution is conditioned thermally so that the process is carried out under optimum operating conditions. Once the electrowinning process has been overcome, the solution is transported towards a disposal tank (disposal TK), which once again sends the solution towards the initial discharge pool in LX.

The latter is carried out a specific number of times until the copper concentration in the solution is lowered to an established value. Once this objective is achieved, the electrolytic solution, when it leaves the bay for the umpteenth time, is derived to the LX area towards the same pool section, but as a raffinate, for re-enrichment in copper and returns to the electrolytic process, thus handling continuous volumes of electrolytic solution.

In the meantime, parallel to this operation, the PLS solution produced in LX is sent simultaneously towards the EW line in place of the previous one, thus completing the fundamental operation and processing of solutions in the plant between both stages.

The final product of the EW process is cathodic copper in the form of sheets measuring 1×1 meter and weighing 42 kilos (kg), with a purity equal to or higher than 98% of Cu, which is stored, packed and dispatched for its commercialization (F7) (FIG. 2).

The Process

The copper cathode productive process, through the LED (Lixiviation with Electrowinning Direct) process requires the supplying and processing of ore that has been crushed previously, by a third party, with a product size in which 100% is under 1.27 cm.

This ore, in an optional and ideal manner, could be stored in stock piles with autonomy of 7 days, which would feed the Agglomeration (AG) stage. Once here, the material is placed in a rotary drum.

Simultaneously, a volume of sulfuric acid between 0.01 and 5 ton/h, preferably 2.11 ton/h, and water is added to the ore, coming from a tank (acid TK) and from the point where water is supplied to the plant, respectively; all this with the purpose of achieving a good percolation and dispersion of the lixiviating solution in the following stage, until an agglomerated ore with a 10% humidity is obtained as a product (as presented in FIG. 3).

Subsequently, the resulting material is emptied from the equipment by overflow and transported on conveyor belts to the truck loading area; the trucks carry the product to the LX area.

Lixiviation Process

Once the ore has been transported from the AG zone, the trucks unload the material in the LX area. Here, loading equipment is responsible for executing the stock piling of the ore in a pad prepared for this purpose, piling the material processed daily until piles of ore are finally formed. As this is being done, the piles prepared for the process are watered initially with a raffinate solution (approximately of 2 to 3 g/L of copper) that comes from the Mixed Pool (from sub-pool or Raffinate Section whose turn it is, specifically), at a maximum rate of between 40 and 80 $m^3$/h. The solution resulting from the watering, called intermediate lixiviation solution (ILS), is sent to the ILS Pool via a system of piping located on one side of the watering pads. This solution is recirculated in the pad between 5 and 20 times, to become enriched in $Cu^{2+}$ until a final concentration between 5 to 30 g/L of copper is obtained. The resulting solution, called pregnant leach solution (PLS), is sent to the Mixed Pool-PLS Section whose turn it is, where it will finally be pumped through pipes and transported to the EW area.

For the process to have the most continuous and versatile operation possible, the ILS and the Mixed Pool have internal divisions, forming sub-pools that permit the obtaining of a dynamic operational play between these and the EW process. In the case of the ILS Pool, these sub-pools permit the deriving of the solution towards the watering of the piles as well as the solution, already in the PLS category, to the Mixed Pool, using an efficient dynamics of distribution valves. Meanwhile, the Mixed Pool permits deriving the solution to the EW process considering different concentrations of $Cu^{2+}$, and also administrate and drive the solution, as a raffinate towards the piles simultaneously, depending on the operational circumstance, giving a variable treatment momentum between both stages.

At the moment when the PLS is sent to the EW-LED plant, the PLS solution is returned simultaneously in recirculation (that comes from EW-LED) towards the same drive section of the Mixed Pool, originating from the electrowinning cells, to thus continue its recirculation process until the concentration of copper dwindles to approximately 4 g/L, to later become re-enriched in $Cu^{2+}$ in its recirculation in the piles until it once again becomes a PLS solution, thus completing the operational circuit in the stage.

Despite not being considered part of the operation, when the pile whose turn it is completes its 90-day watering cycle, the pile must be washed and drained until all the solution retained in it has been extracted, and then it must be removed and loaded in trucks to be taken to its final disposal in dumps. The space left by the material that was removed must be filled with new material for its respective watering process, thus generating a large pile with dynamic material being integrated into it constantly.

The ILS pool receives a replenishment flow of sulfuric acid, if required, and processing water, due to consumption and natural evaporation, respectively, while the Mixed Pool is only provided with process water for the same concepts (FIG. 4).

Electrowinning-LED (EW-LED)

As was mentioned previously, the fresh PLS produced in the LX stage is sent via pipes to the EW-LED area, in a minimum flow range of 3 liters per minute per square meter of cathode to a maximum of 25 liters per minute per square meter of cathode. On line, the solution is conditioned by adding sulfuric acid until a concentration in solution is obtained of 90 to 140 gr/L and replacement process water. Subsequently, it is derived to a heat exchanger of electrolyte/electrolyte plates (E/E) in order to transfer the heat energy from the solution of PLS/Raffinate coming from the process towards the PLS recirculating/fresh entering according to the electrolyte cycle, so as to energize the solution in turn. Then the fluid is treated thermally once again in a plate heat exchanger, this time of electrolyte/water (E/A), operated with hot water as the heat contributing liquid in an operation of countercurrent flows without direct contact, as was the case in the previous equipment, obtaining a conditioned PLS at a temperature in a range of 20 to 60° C., preferably 45° C. Then, in the same line, a solution of cobalt sulfate and Guar (Cobalt sulfate and Guar TK), prepared previously in agitator tanks is added, and acts as an inhibitor of anodic corrosion and controller of the regular texture of the cathodic deposit, respectively. To culminate these steps, the conditioned PLS is finally sent to the EW-LED cells.

The EW-LED copper electrowinning system is made up of a series of electrolytic cells composed of several EW modules connected in series. Each module has several cells (2 to 10) and these, in turn, are formed by an anode-cathode pair. Each cell contains a cathode with an operative area of 1 $m^2$, from which a copper product is obtained having the same area mentioned, and from the anode a minimum current density range is imposed of 150 $A/m^2$ and a maximum of 510 $A/m^2$, preferably 300 $A/m^2$, which is circulated and controlled in series by each cell and module consecutively. The operation format with banks in series, opens the possibility of working with different current densities in each one of them, considering a minimum current of preferably between 150 to 170 $A/m^2$, depending on the chemical quality of the PLS to be processed. If the plant works at one same current, it must operate at a nominal current density of 250 $A/m^2$, to achieve the normal production planned.

The material used to manufacture the electrodes will depend on the quality of the water to be used in the plant. If the water used has a high content of active chlorine, such as seawater, both electrodes will be titanium-based, and if the water used is light in chlorides or chloride-free, such as potable or demineralized water, conventional electrodes will be used: stainless steel 316L as cathodes and lead-calcium-tin alloy in the case of anodes.

The PLS in circulation in the bay is taken from bank to bank using a drive system through feed tanks previously situated individually in each bank. At the same time a replacement solution of Guar is added. Once the outgoing solution has been treated in the banks, it is sent to a transfer tank (Transfer TK) and driven towards the E/E heat exchanger up to the PLS sub-pool in recirculation batch, thus fulfilling a cycle of PLS passage in the plant.

This operation of cycles (sending and returning of PLS in process from LX) is carried out between 3 and 15 times, preferably 6 times, until the concentration of $Cu^{2+}$ is lowered to the minimum metallurgical possible (around 4 to 5 g/L), which will depend on the physical conditions of the electrolyte being processed, which in turn will depend on the characteristics of the ore processed and also on the operation being executed.

When the solution has completed the total number of cycles, in its last discharge from the bay it is sent, as a Raffinate, towards the E/E heat exchanger and subsequently towards its sub-pool, in the LX area, simultaneously driving fresh PLS from another sub-pool coming from the Mixed Pool, so as not to lose operational continuity in the stage, executing the totality of the circuit described.

With regard to the solution heating system, it consists of a water heater, a hot water accumulating tank, the E/E plate exchanger and the E/A plate exchanger. This system operates, on the one hand, with the recirculation of hot water sent towards the E/A exchanger, to transfer its caloric energy to increase and maintain the operational temperature of the PLS sent to the bay. The outgoing water of the equipment is recirculated to the heater for its reconditioning and sent for its redistribution to the storage tank. At the same time, the necessary processing water is added to the heater, at room temperature, to supply hot water to the additive tanks, the replacement due to evaporation and decomposition in the process towards the PLS in circulation line and for the washing of the harvested cathodes. The heater's source of energy is through the burning of diesel oil or another fuel, which is transmitted in the form of heat towards the water circulating in the equipment.

The final product of the EW-LED process is cathodic copper in sheets of approximately 42 kilos (kg), with an area of 1 $m^2$ and a purity equal or higher than 98%; which is washed, detached from the cathode, rolled and stored in the dispatch patio for its commercialization (F7) (FIG. 5).

To summarize, the EW-LED technology is a new hydrometallurgical process that presents four big innovations, with regard to the conventional process, that are the following:

Permits electrowinning copper cathodes, where the continuous current of the electric power system is exactly the same as the current the electrochemical process requires for electrowinning the cathodes. That is, the electrowinning process is a circuit of continuous current in series, while the conventional technology is in parallel.

The electrowinning of copper is carried out based on PLS, differing from the conventional process that requires the extraction stage by solvents to obtain metal-rich electrolyte that feeds the EW cells to obtain top quality cathodes by electrowinning.

The flow of PLS that feeds the electrowinning cells is over 5 times the flow of electrolyte that conventional plants require.

Electrowinning can be carried out from low concentrations of PLS that go from 5 to 50 g/L obtaining cathodes with a high concentration of copper (from 97%).

The low temperature (30° C. to 50° C.) that the conditioning of the PLS requires when entering the electrowinning (less than half of the temperature that is used in traditional electrowinning), leads to a smaller production of corrosive gases and their need to be extracted, and to a lower consumption of energy which is already optimized with the heat exchangers.

The EW-LED Technology

The flow of PLS required in this process feeds, in parallel and in series, the different modules of the electrowinning cells. It must contain between 5 to 50 grams of copper per liter of solution at the moment of initiating the process. Reagents such as guar gum and cobalt sulfate are incorporated into that solution, the dosage at about 320 grams and 220 grams per ton of copper produced respectively, as additives for the cathodes and the anodes respectively prior to entering the modules of the EW-LED Cells.

The PLS is recirculated in the system with a flow in parallel-series form that is sent to the lixiviation piles when it is between 4 to 6 grams of copper per liter of solution.

Another relevant aspect for the optimum functioning of the EW-LED process is the temperature of the PLS that feeds the modules of the EW-LED cells. It must oscillate between 30 and 50° C.

Another of the central aspects of this invention is the bay where the EW-LED process is produced. This bay is made up of a series of banks between 1 to 20 banks, preferably 4. For its part, each bank contains between 1 to 15 electrolytic modules, preferably 7. Therefore, a preferred configuration would have 28 modules in the bay.

On the other hand, each module of electrowinning EW-LED cells consists of 2 to 12 cells, with a preferred configuration in the bay that consists of 112 operative cells, volumetrically independent and compact, each one of the cells consisting of a cathode and an anode; the distribution of the electrical connections in the cells are connected in series between cathodes and anodes and integrated, with the purpose of maintaining an identical continuous current and the same current density in the entire module and inter-modules; the operating area of the cathode is in the range of 2 to 0.3 $m^2$, preferably 1 $m^2$; the current density is regulated in the module in a range between 0 and 450 amperes, with an operating current density between 150 and 300 amperes per $m^2$ of cathode; there is also a system of pipes with independent control of the flow of PLS through each cell and module; and an independent control of the electric field for each group of modules of cells through the electric power supplied by rectifier transformers.

One of the important parts of the module is the channeling, with independent control, of the flow of PLS that permits feeding a variable flow of PLS, between 4 and 22 L/min/$m^2$ of cathode, to a group of modules and in an independent manner to each electrowinning cell.

Figure 1:
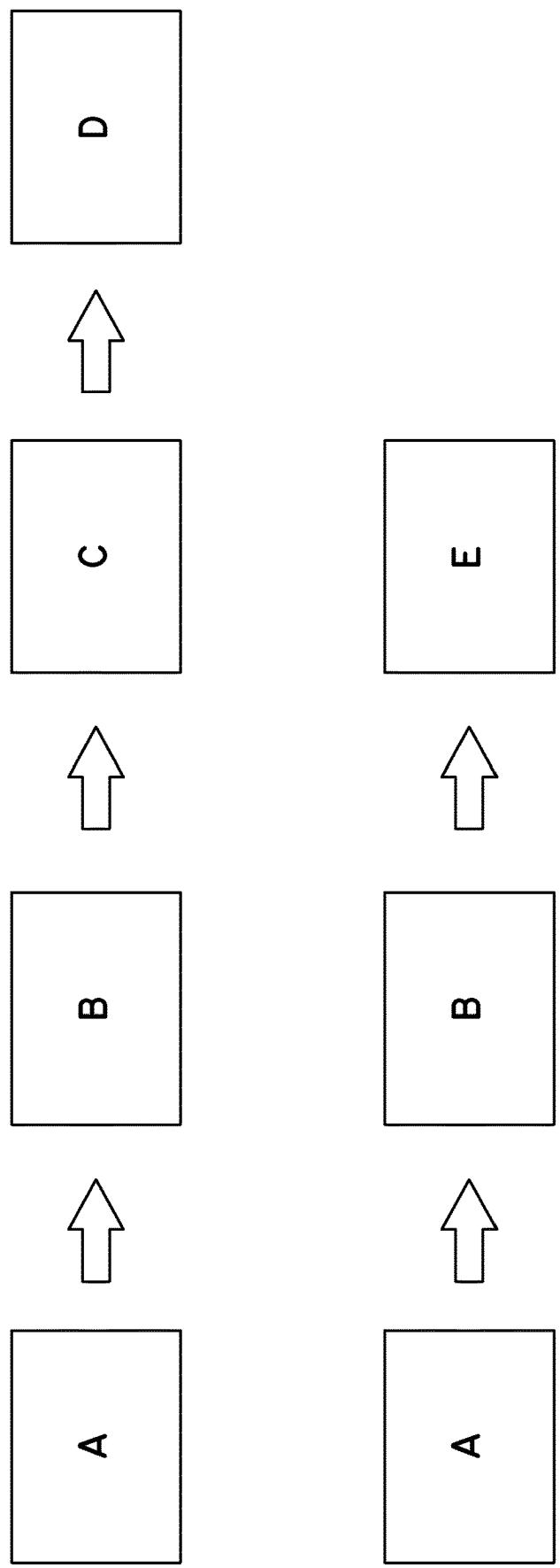
FIG. 1
Figure 2:
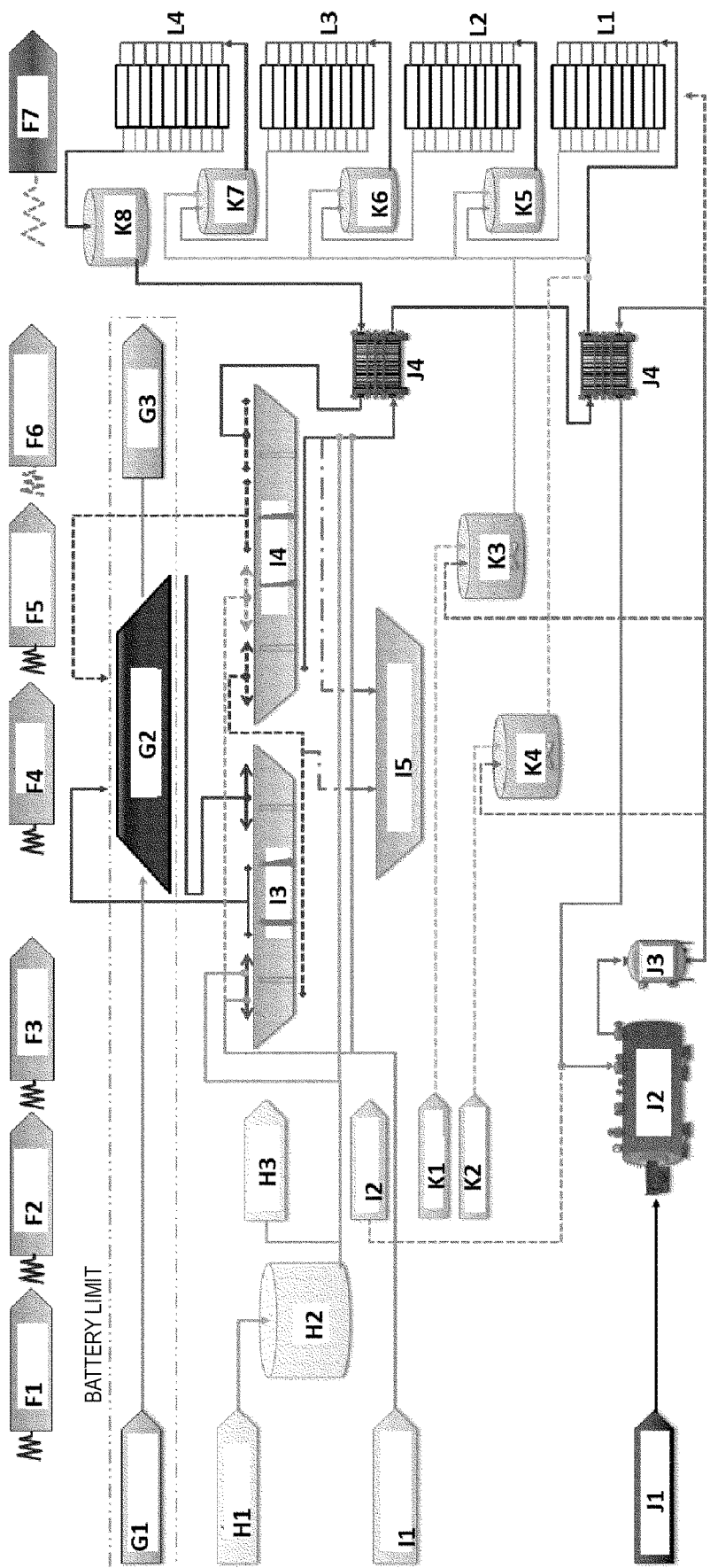
Figure 3:
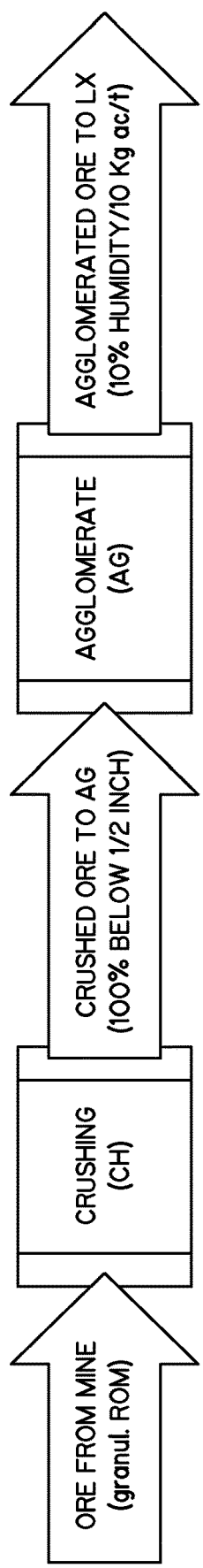
Figure 4:
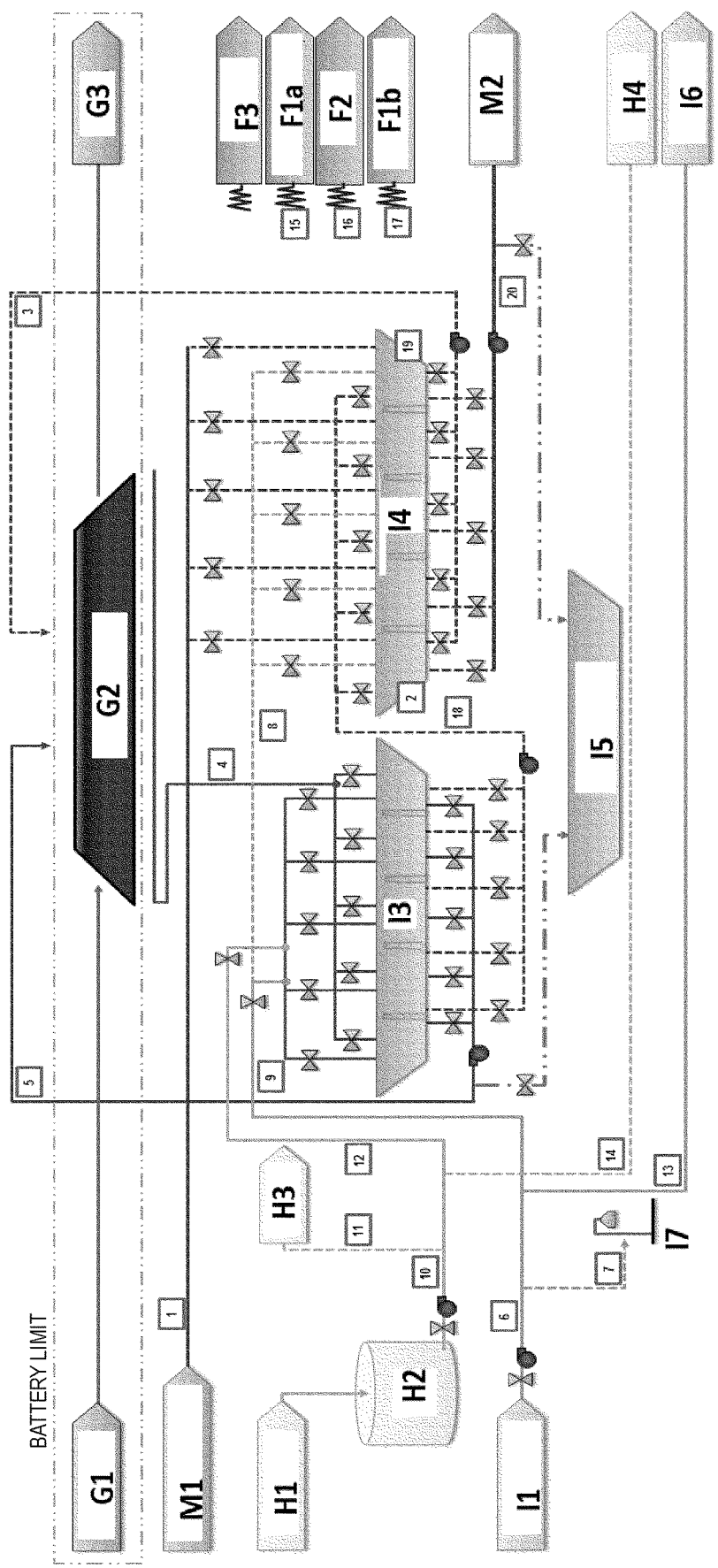
Figure 5:
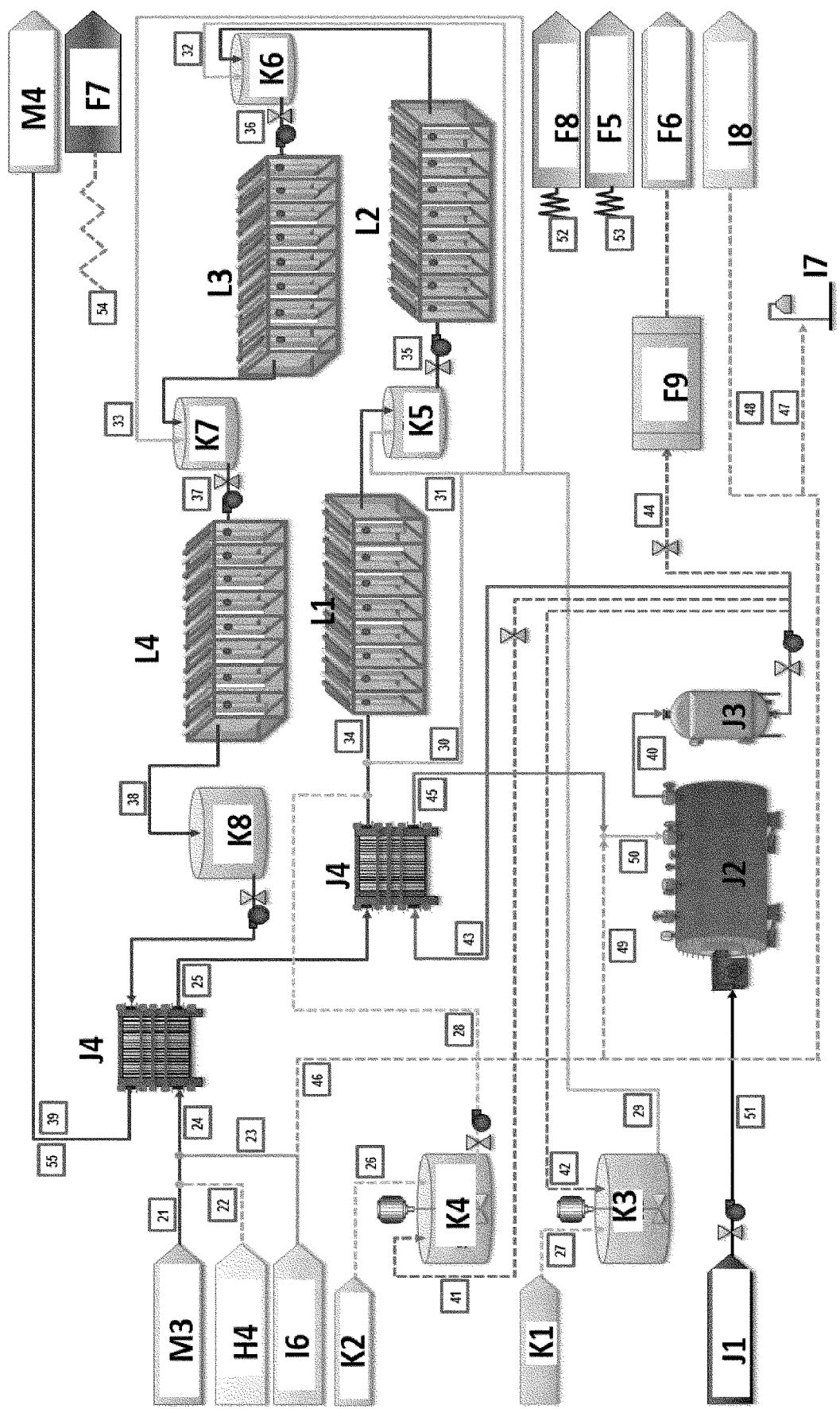

This figure presents a simplified sketch of the traditional copper cathode production process (upper sketch) versus a simplified sketch of the process of this invention (lower sketch).

A: Crushing: at this stage, the material extracted is reduced to smaller and smaller and more compact portions.

B: Lixiviation (LX): Metallurgical technique that consists of watering the piles of mineralized material with a solution of water with sulfuric acid, dissolving the copper contained in the oxidized ores and forming a solution of copper sulfate, which is taken to the PLS (pregnant leaching solution) pools.

C: Extraction by solvent (SX): is a method of separating one or more substances from a mixture, using solvents, obtaining a solution rich in copper.

D: Electrowinning (EW): this is a process whereby the copper solution [electrolyte concentrated in copper, after the extraction by solvents (SX)] is taken to the electrowinning bay where there are a series of cells, that when a current is applied to them, the copper sulfate solution breaks down, and the copper becomes adhered to the cathodes.

E: Direct Electrowinning with Lixiviation (EW-LED) is a process whereby the LPS solution [Solution obtained after the lixiviation (LX) stage] is taken to the different modules of the modified electrowinning cells, after the incorporation of reagents such as guar gum and cobalt sulfate as additives for the cathodes, finally the copper becomes adhered to the cathodes.

FIG. 2

This figure represents a general diagram of the productive process of this invention.

The line of arrows of the upper part of the diagram shows the physical phenomena that the water suffers in the different positions of the movement of the ore:

X: Impulse pumps
: Flow controllers and temperature meters
F1: Evaporation of the mixed pool
F2: Evaporation of the ILS pool
F3: Evaporation piles
F4: Evaporation in EW
F5: Decomposition of water by electrolysis
F6: Washing water to discard
F7: Production of copper cathode The line immediately below the arrows of the upper part shows the behavior of the solid material in the different positions of the movement of the ore:

G1: Agglomerated ore from the crusher-binder
G2: Dynamic pile
G3: Gravel to dump In the following line of arrows, the handling of the acid is presented:

H1: Sulfuric acid from trucks
H2: Acid TK
H3: Sulfuric acid to agglomeration.

In the following line of arrows, the handling of the process water is presented:

I1: Process water from water supply
I2 Service water
I3: ILS pool
I4: Mixed pool
I5: Emergency pool The last line presents the system's heating network:

J1: Oil supply
J2: Boiler
J3: Water conditioning chamber
J4: Heat exchangers

There are other parts associated to the adaptation and preparation of the LPS before the EW-LED:

K1: Chemical product, concentrated Guar
K2: Chemical product, concentrated cobalt sulfate
K3: Guar TK, this is a tank where the Guar is diluted in water and is left at an optimum concentration to be applied to the PLS that is sent to the EW cells.
K4: Cobalt TK, this is a tank where the cobalt sulfate is diluted in water and is left at an optimum concentration to be applied to the PLS that is sent to the EW cells.
K5: TK Bank 2, this is a tank where the electrolyte in series is received when it has passed once through the first bank of the EW-LED system. (Without restricting the number of banks to be used except when the concentration of the electrolyte reaches a range below 4 g/L.)
K6: TK Bank 3, this is a tank where the electrolyte in series is received when it has passed once through the second bank of the EW-LED system. (Without restricting the number of banks to be used except when the concentration of the electrolyte reaches a range below 4 g/L.)

K7: TK Bank 4, this is a tank where the electrolyte in series is received when it has passed once through the third bank of the EW-LED system. (Without restricting the number of banks to be used except when the concentration of copper in the PLS solution reaches a range below 4 g/L.)

K8: TK transfer bank, this is a tank where the PLS is received, in series, that has passed once through the fourth bank of the EW-LED system. (Without restricting the number of banks to be used except when the concentration of the PLS reaches a range below 4 g/L.)

The PLS used is transferred to the mixed pool.

L1: EW-LED bank No 1
L2: EW-LED bank No 2
L3: EW-LED bank No 3
L4: EW-LED bank No 4

FIG. 3

This figure represents a specific sketch of the stages prior to the LED process.

FIG. 4

This figure represents a flow diagram of the lixiviation process.

In the arrows of the right part of the diagram, the physical phenomena that the water suffers in the different positions of the movement of the ore are presented:

X: Impulse pumps
: Flow controllers and temperature meters
F1a: Evaporation of the mixed pool, raffinate section
F1b: Evaporation in the mixed pool, PLS section
F2: Evaporation ILS pool
F3: Evaporation piles In the upper line of arrows, the behavior of the solid material in the different positions of the ore movement is presented:

G1: Agglomerated ore from the crusher-binder
G2: Dynamic pile
G3: Gravel to dump In the following line of arrows, the handling of the PLS and one line is shown:

M1: PLS in recirculation/raffinate from EW-LED
M2: PLS/PLS recirculated to EW-LED In the following line of arrows, the handling of the acid is shown:

H1: Sulfuric acid from trucks
H2: TK acid
H3: Sulfuric acid to agglomeration
H4: Sulfuric acid to EW-LED In the following line of arrows, the handling of the process water is presented:

I1: Process water from water supply
I3: ILS pool
I4: Mixed pool
I5: Emergency pool
I6: Process water to EW-LED
I7: Emergency LX shower Additionally, the following numbering shows:
1. Discharge of Raffinate from EW
2. Raffinate available from EW (by balance)
3. Raffinate to watering
4. ILS to pool
5. ILS in recirculation to watering
6. Process water to operations
7. Water to emergency LX service
8. Water to Mixed Pool (Raffinate section)
9. Water to ILS pool
10. Sulfuric acid to operations
11. Sulfuric acid to Agglomeration
12. Sulfuric acid to ILS pool
13. Process water to EW
14. Sulfuric acid to EW
15. Evaporation Mixed Pool (Raffinate section)
16. Evaporation ILS pool
17. Evaporation Mixed Pool (PLS section)
18. PLS to Mixed Pool (PLS section)
19. PLS available to EW (by balance)
20. Discharge of PLS to EW

FIG. 5

This figure represents a diagram of direct electrowinning process flows in series EW-LED.

In the line of arrows of the lower right hand part of the diagram, the physical phenomena that the water suffers in the different positions of the movement of the ore are presented:

F5: Decomposition of water by electrolysis
F6: Washing water to discard
F7: Production of copper cathodes
F8: Evaporation of the water by environment
F9: Water for washing cathodes In the following line of arrows, the handling of the acid is presented:

X: Impulse pumps
: Flow controllers and temperature meters
H4: Sulfuric acid to EW-LED.

In the following line of arrows, the handling of the process water is presented:

I6: Process water to EW-LED
I7: LX emergency shower
I8: Service water for human consumption The final line presents the system's heating network:

J1: Oil supply
J2: Boiler
J3: Water conditioning chamber
J4: Heat exchangers

There are other parts associated to the adaptation and preparation of the LPS before the EW-LED.

K1: Chemical product, concentrated Guar
K2: Chemical product, concentrated cobalt sulfate
K3: TK Guar, this is a tank where the Guar is diluted in water and left at an optimum concentration to be applied to the PLS that is sent to the EW cells.
K4: TK Cobalt, this is a tank where the cobalt sulfate is diluted in water and is left at an optimum concentration to be applied to the PLS that is sent to the EW cells.
K5: TK Bank 2, this is a tank where the PLS in series is received when it has passed once through the first bank of the EW-LED system. (Without restricting the number of banks to be used except when the concentration of PLS reaches a range below 4 g/L.)
K6: TK Bank 3, this is a tank where the PLS in series is received when it has passed once through the second bank of the EW-LED system. (Without restricting the number of banks to be used except when the concentration of PLS reaches a range below 4 g/L.)
K7: TK Bank 4, this is a tank where the PLS in series is received when it has passed once through the third bank of the EW-LED system. (Without restricting the number of banks to be used except when the concentration of PLS reaches a range below 4 g/L.)
K8: TK transfer bank, this is a tank where the PLS is received, in series, that has passed once through the fourth bank of the EW-LED system. (Without restricting the number of banks to be used except when the concentration of PLS reaches a range below 4 g/L.)

The PLS used is transferred to the mixed pool.
L1: EW-LED No 1 bank
L2: EW-LED No 2 bank
L3: EW-LED No 3 bank
L4: EW-LED No 4 bank In the following line of arrows, the handling of the PLS and a line are presented:
M3: PLS/PLS recirculated from LX
M4: PLS recirculated/raffinate to LX Additionally, the following numbering shows:
21: PLS to conditioning
22: Sulfuric acid to line
23: Process water to line
24: PLS to E/E heat exchanger
25: PLS to E/A heat exchanger
26: Cobalt sulfate to Cobalt sulfate TK
27: Guar to Guar TK
28: Solution of cobalt sulfate
29: Solution of guar to distribution
30: Guar solution to EW 1 Bank
31: Guar solution to EW 2 Bank
32: Guar solution to EW 3 Bank
33: Guar solution to EW 4 Bank
34: PLS to EW 1 Bank
35: PLS to EW 2 Bank
36: PLS to EW 3 Bank
37: PLS to EW 4 Bank
38: PLS to transfer TK
39: PLS in circulation to pool
40: Hot water from heater
41: Hot water to Cobalt Sulfate TK
42: Hot water to Guar TK
43: Hot water to heat exchanger
44: Hot water to cathode washing
45: Hot water in return
46: Process water to services and operation
47: Water to EW-LED emergency service
48: Water to human consumption service
49: Process water to replacement
50: Water to heater
51: Oil to heater
52: Evaporation of water in bay
53: Decomposition of water in bay
54: Cathodic copper
55: Propelling raffinate to LX

FIGS. 6A-6D

Figure 6A:
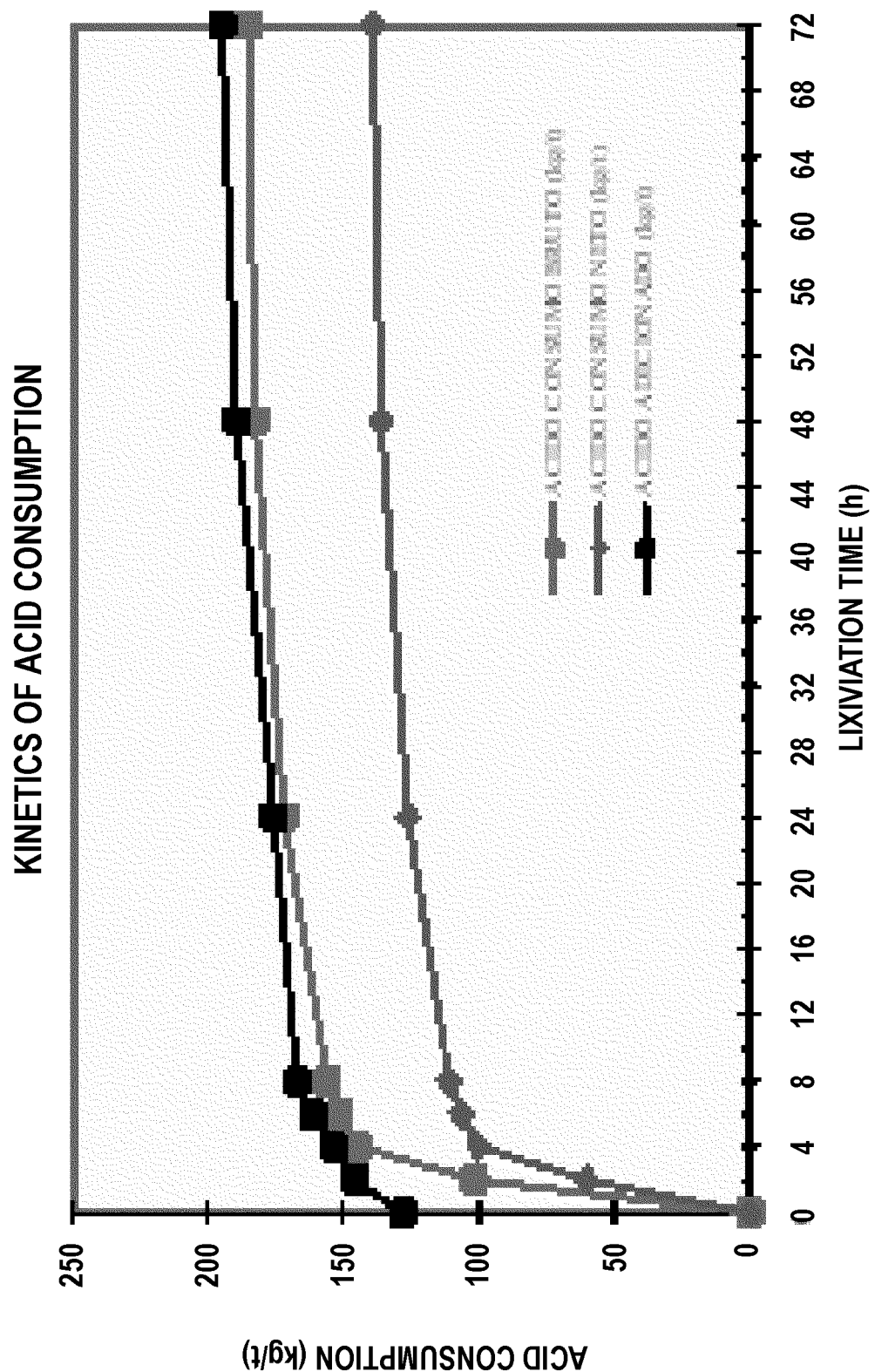
Figure 6B:
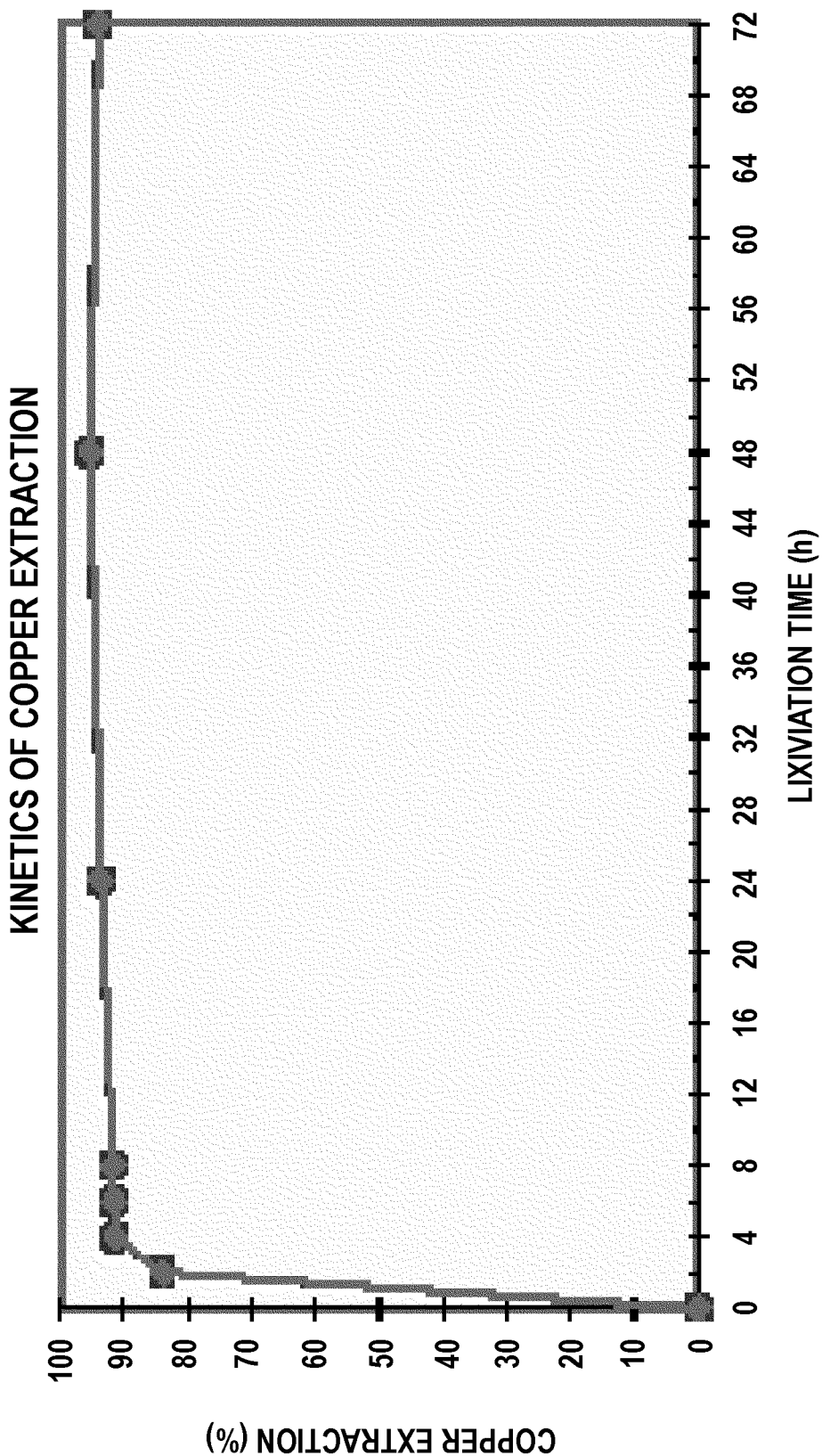

These figures present, in FIGS. 6A and 6B, the Iso-pH tests in material of Bella Andina.

Figure 6C:
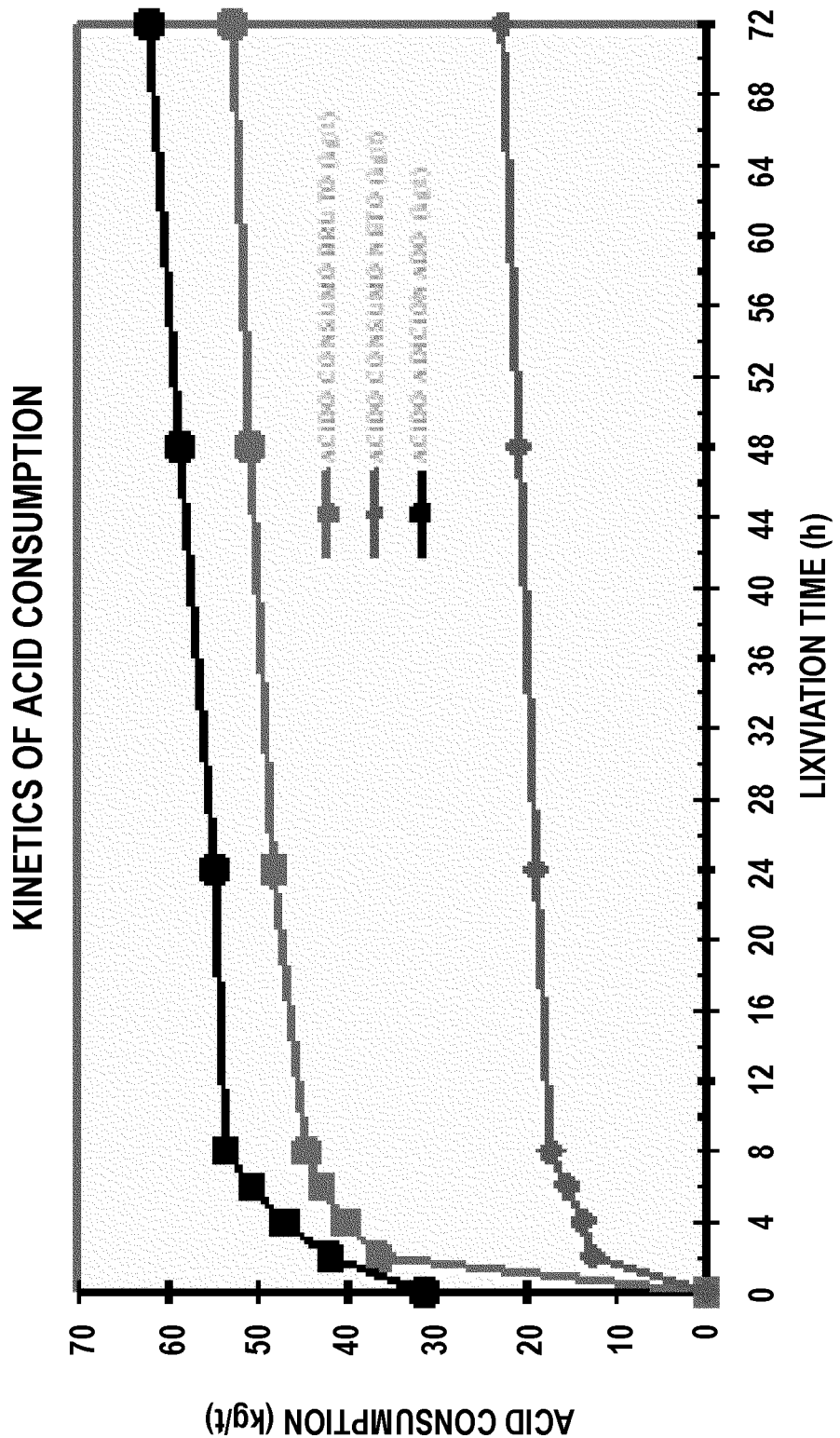
Figure 6D:
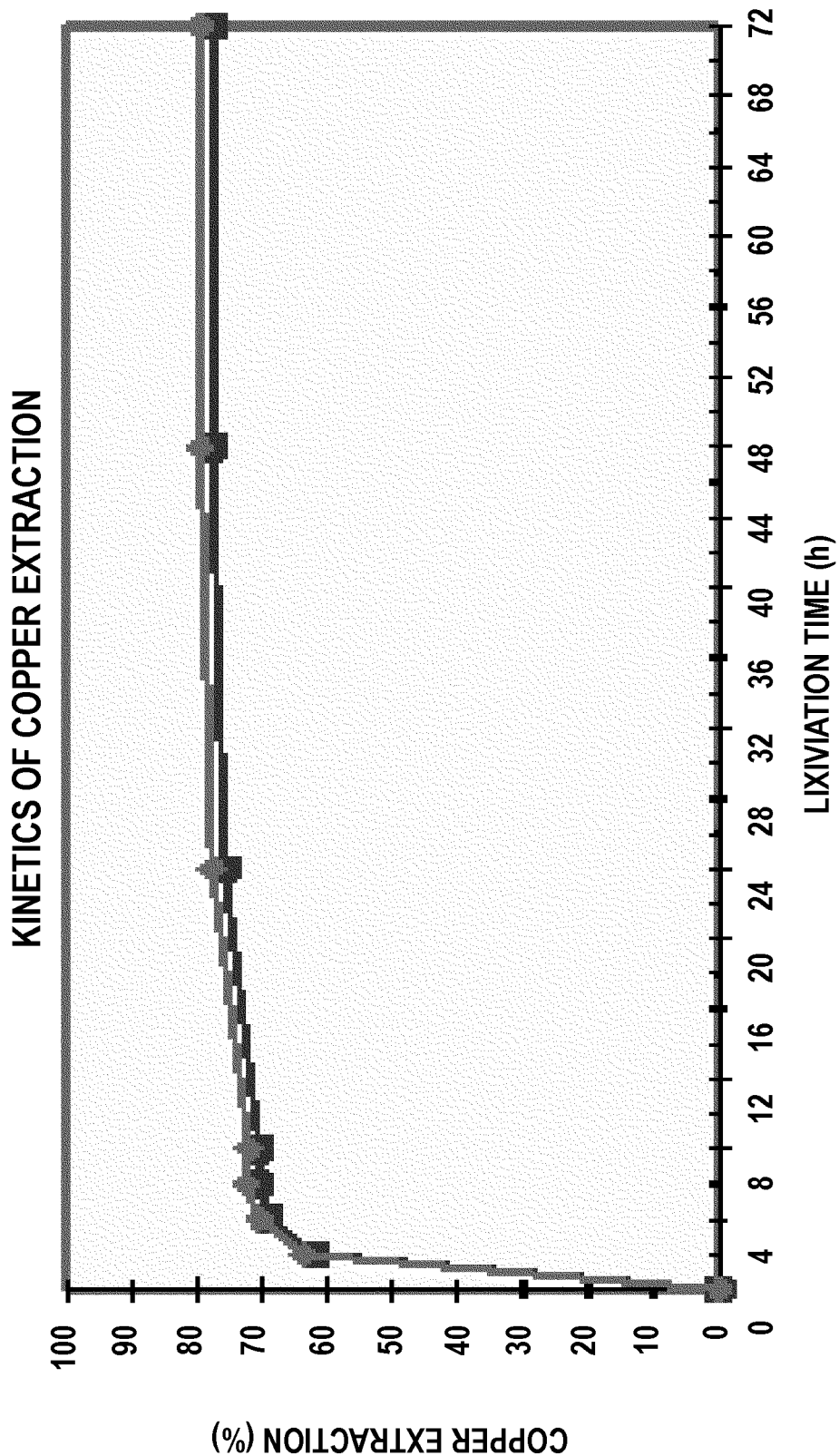

FIGS. 6C and 6D present the Iso-pH tests in material from Chiapa.

FIGS. 7A-7B

In these figures, the sulfation tests on the ITE material (graph of FIG. 7B) and in the composite material (graph of FIG. 7A) are described.

FIGS. 8A-8B

Figure 8A:
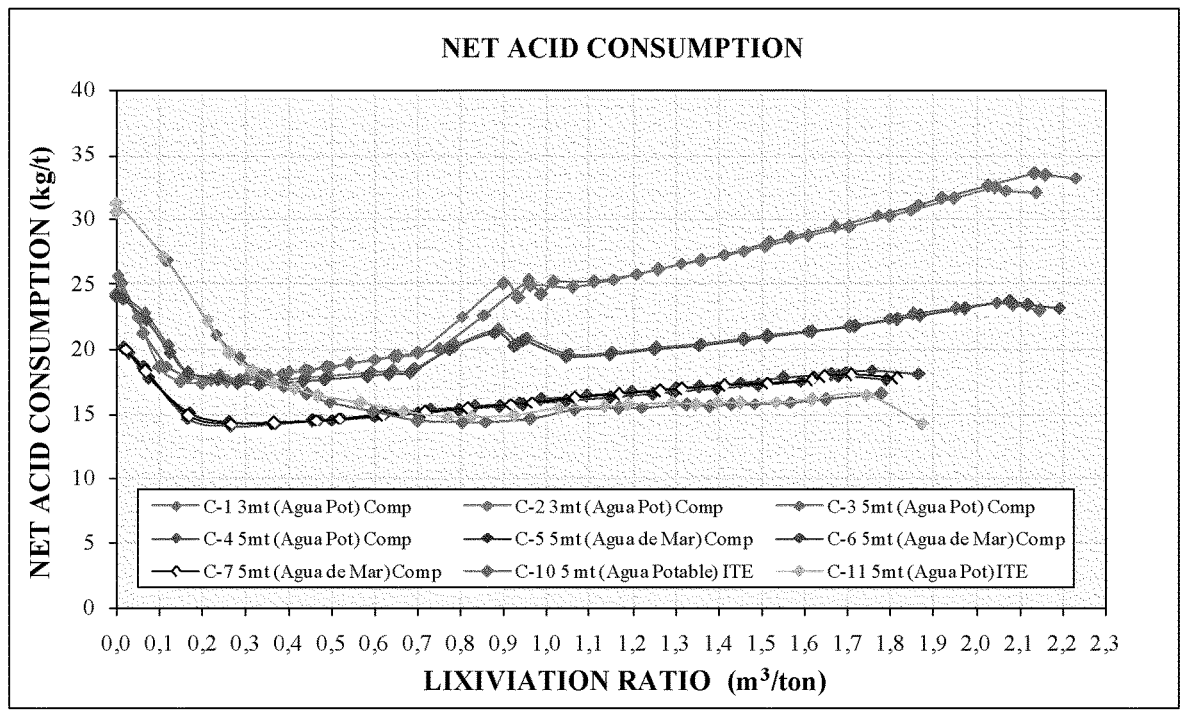
Figure 8B:
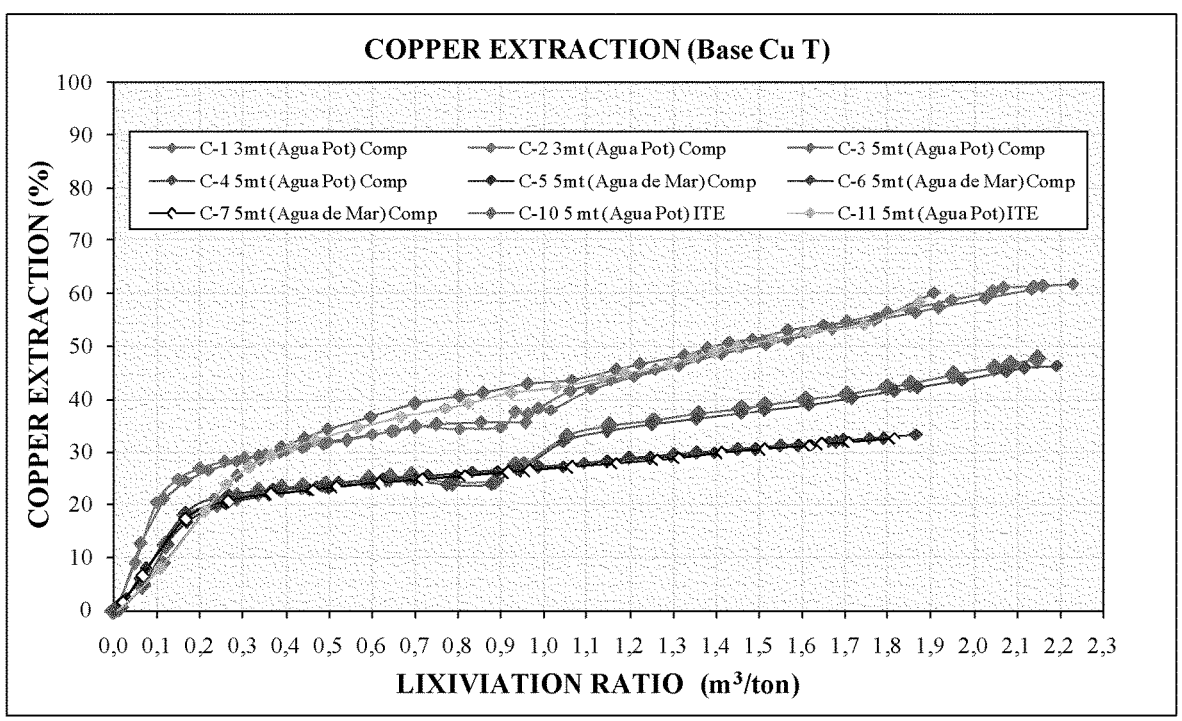

In FIG. 8B, the graph presents the relationship between the percentage of copper extraction and the lixiviation ratio. It is clear that the extraction is not optimum with regard to the presentation of the PLS to the exposure to traditional EW, that achieves concentrations of approximately 48 grams per liter of copper in the electrolyte.

The graph of FIG. 8A presents the relationship between the net acid consumption and the lixiviation ratio.

FIG. 9

This figure presents a photograph of a copper cathode extracted by the direct EW technique, the object of this patent.

EXAMPLES OF APPLICATION

Experimentally, 2300 kg of crushed ore were prepared and screened until a product size below 1.27 cm or half an inch in size, with a granulometry of P80, was obtained.

This ore was stored to be used as the tests were developed, just as it happens in reality where a stock pile is stored. Once here, the material that was used for the tests was separated in sub-lots of 50 Kilograms. One of the sub-lots was used to execute a chemical characterization (500 g), iso-pH (1000 g) and metallurgical characterization.

A 5 kg sample of a sub-lot was crushed and shaken in a rotary drum so as to obtain representative 250 g samples.

The tests carried out with these samples are:

a. Chemical Analysis of Leach feed CuT (Total Cu), CuS (Soluble Cu), FeT (Total Fe), Al, Mg, Mn, Na, K, Cl and CAA (Consumption of Analytic Acid).

In order to quantify the contaminating elements in the ore sample, analysis by ICP (inductive coupling plasma) of 31 elements were carried out in the leach feed sample.

b. Preliminary Metallurgical Tests

Preliminary metallurgical tests were carried out with the object of obtaining results of metallurgical parameters of lixiviation.

c. Test of Iso-pH These tests are executed using 1 kg of ore with adequate granulometry, for a period of 48 hours and with a percentage of solids of 33%. The tests are carried out in a plastic reactor with a capacity of 10 liters, which rotates on a roller at 55 rpm, designed especially for doing this work.

The leaching solution is maintained always at a pH of 1.5. This situation is reached by the constant and permanent addition of the $H_2SO_4$ acid, which is reported as a net and gross consumption of acid.

With a frequency of 2, 4, 6, 8, 10, 24, 48 hours, samples of pulp (with a 10% humidity) are taken to carry out the follow-up of the kinetics of copper extraction and acid consumption. At the end of the lixiviation period, the pulp is filtered and washed, obtaining a rich solution and a washing solution.

The ore cake (lixiviation gravels) is dried, weighed, disintegrated and analyzed for Total Cu (CuT) and Total Fe (FeT), and finally, on the basis of weights, volumes of solutions and chemical analysis, execute a metallurgical balance.

d. Sulfation Test

The sulfation tests were used to determine the dose of acid to be employed in the column lixiviation tests. This protocol formed part of a set of four sulfation tests, that employed a rest period of 48 hours. Once the rest period was finished, the sample was washed to obtain the solution and characterization by Cu, acid free. From the results obtained in the four sulfation tests, it was determined that the dose of acid in curing, under the principle of employing the smallest amount of acid, on which the residual acid starts to remain. This dose of acid was employed to cure the ore prior to the column lixiviation stage.

e. Column Lixiviation Tests

The objective of the column lixiviation tests was to obtain PLS solutions with contents of weighted Cu between 8 to 10 g/L, because at this level, this is what is required for use in EW tests.

The metallurgical program carried out nine (9) lixiviation tests in columns of 20.32 cm (8 inches) in diameter and 3-5 meters of height. Each test used an acid rate in curing determined on the basis of the sulfation tests. The irrigation rate was of 10 L/h/m². Moreover, the type of water constituted a variable, which is why six (6) columns employed a lixiviation solution made up of acidulated potable water and three (3) columns with acidulated seawater.

The lixiviation ratio was 2 m³/ton, or else until a concentration of 8-10 g/L of Cu was obtained.

The control of the experiments included a daily analysis for: Cu, FeT and H+, during the first five (5) days, to then continue with samplings every other day, until the end of the irrigation cycle.

The results of these experiences were as follows:

For the chemical characteristic, three ore samples originating in Peru were taken that correspond to the Bella Andina, ITE and Chiapa mines. These mineral deposits lie very close to Arica.

A composite was made with the samples from Bella Andina and Chiapa, which were characterized by means of atomic absorption techniques and ICP, whose results are shown in Tables I and II.

TABLE I

| Sample | CuT (%) | CuS (%) | FeT (%) | Al (%) | Mg (%) | Mn (%) | Na (%) | K (%) | Cl (%) | CAA (kg/t) |
|---|---|---|---|---|---|---|---|---|---|---|
| Chiapa Mine | 2.45 | 2.00 | 10.66 | 3.71 | 0.22 | 0.13 | 0.06 | 0.07 | 0.50 | 160.7 |
| Bella Andina Mine | 3.17 | 3.05 | 6.66 | 4.91 | 1.81 | 0.31 | 0.21 | 0.14 | 0.16 | 305.8 |
| Composite (75; 25) | 2.63 | 2.26 | 9.66 | 4.01 | 0.62 | 0.17 | 0.10 | 0.09 | 0.41 | 197.0 |

The results obtained show that both ores have a high ore content of Cu Total: 2.45 and 3.17% for Bella Andina and Chiapa, respectively, while the CuS was of 2.0 and 3.05% (Bella Andina and Chiapa), indicating a solubility ratio of 81.6% for (Chiapa Mine), while (Bella Andina) showed a solubility ratio of 96.2%. The samples showed high in FeT, 10.7 and 6.7% for Bella Andina and Chiapa, respectively. With regard to cations analyzed (Al, Mg, Na, K), these present normal levels, Al between 3.7 and 5%, Mg between 0.22 and 1.81%. Then, in concentrations below 1%, we have Na, K, Cl; these latter elements are indicative of the absence of soluble salts in both ores.

TABLE II

| Element | Unit | Bella Andina | Chiapa | ITE |
|---|---|---|---|---|
| K | (%) | 0.02 | 0.05 | 0.11 |
| Na | (%) | 0.03 | 0.10 | 0.09 |
| Ti | (%) | 0.19 | 0.12 | 0.03 |
| S | (%) | 0.34 | 2.53 | 0.05 |
| Mg | (%) | 1.22 | 0.14 | 0.34 |
| Al | (%) | 3.03 | 1.95 | 0.79 |
| Fe | (%) | 5.22 | 8.82 | >15.0 |
| Ca | (%) | 10.86 | 12.68 | 0.20 |
| Cu | (ppm) | >10000 | 0 | >1000 >100 00 |
| Zn | (ppm) | >10000 | 250 | 88 |
| Mn | (ppm) | 4076 | 1416 | 218 |
| As | (ppm) | 2899 | 49 | 10 |
| P | (ppm) | 939 | 3713 | 385 |
| Ni | (ppm) | 289 | 35 | 43 |
| Pb | (ppm) | 260 | 126 | 45 |
| Tl | (ppm) | 218 | 64 | <10 |
| Sr | (ppm) | 140 | 157 | 15 |
| V | (ppm) | 133 | 25 | 84 |
| Cd | (ppm) | 114 | 2 | 3 |
| Ba | (ppm) | 66 | <10 | 19 |
| Zr | (ppm) | 50 | 13 | 8 |
| Cr | (ppm) | 44 | 57 | 60 |
| Co | (ppm) | 38 | 21 | 84 |
| La | (ppm) | 38 | <10 | <10 |
| Sb | (ppm) | 28 | <5 | <5 |
| Li | (ppm) | 26 | 16 | 4 |

TABLE II-continued

| Element | Unit | Bella Andina | Chiapa | ITE |
|---|---|---|---|---|
| Y | (ppm) | 23 | 18 | 3 |
| Ga | (ppm) | 18 | 16 | 22 |
| Ta | (ppm) | 15 | 9 | 24 |
| Ag | (ppm) | 11 | 19 | <1 |
| Sc | (ppm) | 10 | 4 | <1 |
| Bi | (ppm) | 9 | <5 | 10 |
| Mo | (ppm) | 9 | 8 | 20 |
| Be | (ppm) | 3 | <1 | <1 |
| Th | (ppm) | <5 | <5 | <5 |
| Nb | (ppm) | <10 | <10 | <10 |
| Se | (ppm) | <10 | <10 | <10 |
| Sn | (ppm) | <10 | <10 | <10 |
| Te | (ppm) | <10 | 11 | 20 |
| U | (ppm) | <10 | <10 | <10 |

TABLE II-continued

| Element | Unit | Bella Andina | Chiapa | ITE |
|---|---|---|---|---|
| W | (ppm) | >10 | <10 | <10 |
| Hg | (ppm) | <1 | <1 | <1 |

This table presents the results of the ICP

With regard to the elements analyzed by ICP, we draw attention to the Calcium content in both samples, indicative of a high consumption of acid.

One of the relevant aspects in the chemical characterization is the determination of the contents of soluble salts in the samples and their consumption of acid, for which ore lixiviation was carried out with a granulometry of 10#, with one (1) liter of hot water (boiling), which was shaken during one hour.

The solution obtained was analyzed for Na, Cl and K, whose results are shown in Table III below.

TABLE III

| | Solution Analysis | | | Dissolved Salts | | |
|---|---|---|---|---|---|---|
| Washing solution | Na (g/L) | Cl— (g/L) | K (g/L) | Na (g) | Cl— (g) | K (g) |
| Bella Andina | 0.118 | 0.61 | 0.013 | 0.12 | 0.61 | 0.01 |
| Chiapa | 0.174 | 0.40 | 0.035 | 0.17 | 0.40 | 0.04 |

This table presents the dissolution of salts in hot water. It is also observed that the concentration of dissolved salts is low in the three cases; the possibility of significant concentrations of hydrochloric acid in situ does not exist.

The next step in the tests were the metallurgical tests in which Iso-pH, sulfation and column lixiviation tests were carried out.

The first test was carried out for the samples from Bella Andina (1940 g) and Chiapa (1946 g), a constant pH of 1.5.

The results of this test are seen in FIGS. 6A-6D and in the following Table IV.

TABLE IV

| | LEACH FEED | | RESULTS | | | Acid consumption (kg/t) | |
|---|---|---|---|---|---|---|---|
| | CuT | CuS | Cu Extraction (%) | | | | |
| Sample | (%) | (%) | Analysis | Calc. | Earth | Gross | Net |
| Bella Andina Mine | 3.17 | 3.05 | 93.97 | 93.97 | 93.97 | 185.19 | 185.19 |
| Chiapa | 2.45 | 2.00 | 79.56 | 77.68 | 77.14 | 52.85 | 22.78 |
| ITE | 3.45 | 3.40 | 85.20 | 89.39 | 89.89 | 67.89 | 22.69 |

This table presents a summary of the results of the Iso-pH tests. It can also be seen that the samples present high extraction levels of Cu, of 94% for Bella Andina and 89% for Chiapa. On its part, the consumption of acid presented the highest levels for Bella Andina, 185 kg/t, while for the ITE and Chiapa samples, the net consumption was 23 kg/t.

Figure 7A:
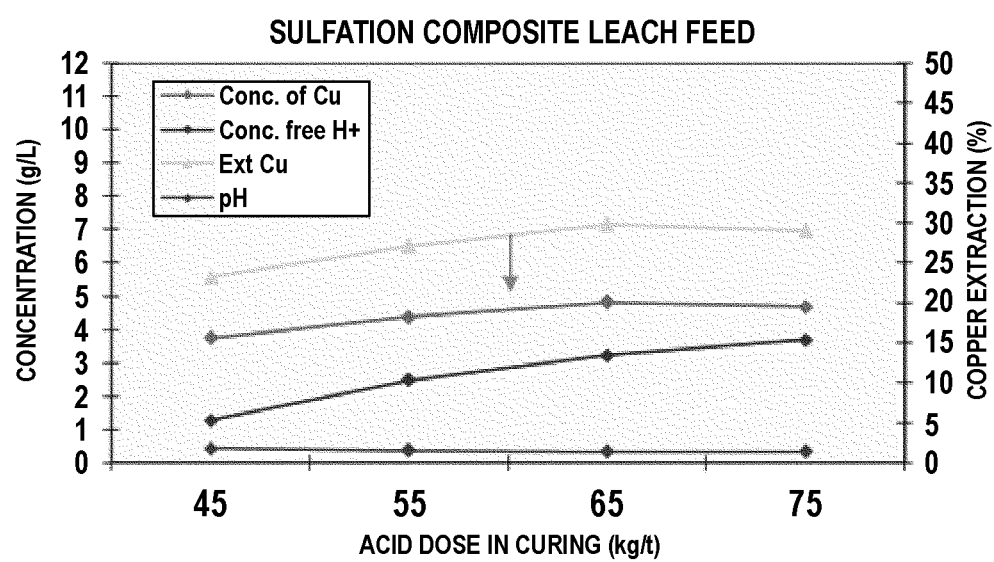
Figure 7B:
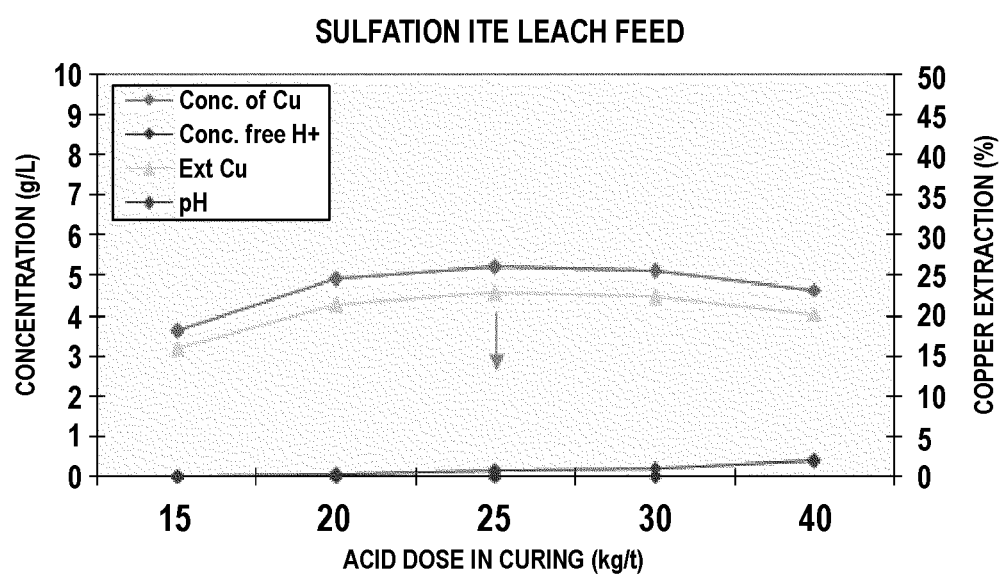

On the other hand, the sulfation test was carried out based on the results obtained in the acid consumption in the iso-pH tests. The sulfation tests were executed with concentrations of 35, 45, 55 and 65 kg/t, whose results are reported in Table IV. FIGS. 7A-7B.

Based on the results presented in FIGS. 7A-7B, the acidity levels in the agglomerate were obtained from the sulfation tests.

As the next step, the column lixiviation tests were executed, which consisted in obtaining a PLS solution, with Cu contents between 8 to 10 g/L. The results of these tests are clearly evident in Table V and FIGS. 8A-8B.

According to the results obtained, a low Copper extraction was observed, whose maximum value was 58% (C-1 and C-2) for the 3-meter columns (bed height) and 45% for the 5-meter columns (C-3 and C-4), executed with a mineral composite (25% Bella Andina and 75% Chiapa). The columns with ITE mineral (C-10 and C-11) presented 47% of Cu extraction. These tests only reached a Lixiviation Ratio of 2 m³/t. All these results were inferior to the solubility ratio, that in all the cases was higher than 90%, which is why certain adjustments needed to be made in the experimental operation.

The low extraction level observed in all the experiences was the result of not operating under optimized conditions for a lixiviation by percolation based on:

Granulometry: was employed au naturel and was obtained at the Industrial Plant in Arica. The material was segregated, with the component of fine material very low.

The end condition of the experience was the concentration of Cu in PLS and not the level of maximum extraction (which was not sought by the subsequent EW process).

Based on the above, an additional column was loaded to produce the volume and concentration of Cu required to be able to carry out the EW test.

In the first days, the PLS solution presented concentrations high is Fe (30 to 40 g/L) which are not adequate for the EW process. This is why the PLS was recirculated in the same column, thereby reducing the iron intake as the consumption of acid.

With regard to the concentration of Cu, the columns made with the composite (Bella Andina and Chiapa) presented a concentration of 8 to 9 g/L, weighted, while the tests executed with the ITE mineral, the concentration was of 22 g/L. With mixtures of both solutions, we managed to obtain the PLS solution for the EW tests.

The consumption of net acid was 33 kg/ton for columns C-1 and C-2 (3 m), while for C-3 and C-4 (5 m) the consumption was 24 kg/ton, executed with the composite (Bella Andina and Chiapa). The C-10 and C-11 tests, executed with ITE mineral, presented low levels of net acid consumption of 16 kg/ton.

The tests made with seawater were started at different times than the tests with potable water, the columns C-5, C-6 and C-7, with composite sample (5 m), only reaching the lixiviation ratio of 2 m³/ton. These presented low extraction levels of Cu (30%), the concentration of Cu (weighted) was of 8 g/L. On its part, the net acid consumption was of 17 kg/ton.

As the objective of the tests was to obtain PLS, the solutions were stored based on the concentration of Cu; therefore, they were placed in separate drums by concentrations between 10 and 20 g/L, 5 and 10 g/L and less than 5 g/L.

As can be seen, the results obtained in the nine experiences are the consequence of a process to obtain PLS solution of conditions required to be used in a direct EW process. Therefore, the metallurgical results obtained are not the consequence of an optimized process of lixiviation by percolation.

TABLE V

| Metallurgical Parameters | Unit | C-1 | C-2 | C-3 | C-4 | C-5 | C-6 | C-7 | C-10 | C-11 |
|---|---|---|---|---|---|---|---|---|---|---|
| ID Sample | | Composite | Composite | Composite | Composite | Composite | Composite | Composite | ITE | ITE |
| LEACH FEED | | | | | | | | | | |
| Total Copper grade | % | 2.42 | 2.42 | 2.42 | 2.42 | 2.42 | 2.42 | 2.42 | 3.45 | 3.45 |
| Soluble Copper grade | % | 2.21 | 2.21 | 2.21 | 2.21 | 2.21 | 2.21 | 2.21 | 3.4 | 3.4 |
| Solubility ratio | % | 90.95 | 90.95 | 90.95 | 90.95 | 90.95 | 90.95 | 90.95 | 98.64 | 98.64 |
| Granulometry | inch | P80 ½" | P80 ½" | P80 ½" | P80 ½" | P80 ½" | P80 ½" | P80 ½" | P80 ½" | P80 ½" |
| OPERATING CONDITION | | | | | | | | | | |
| Height | m | 3 | 3 | 5 | 5 | 5 | 5 | 5 | 5 | 5 |
| Diameter | inch | 8 | 8 | 8 | 8 | 8 | 8 | 8 | 8 | 8 |
| Acid in curing | Kg/t | 25 | 25 | 25 | 25 | 20 | 20 | 20 | 30 | 30 |
| Watering solution | — | Potable | Potable | Potable | Potable | Sea | Sea | Sea | Potable | Potable |

TABLE V-continued

| Metallurgical Parameters | Unit | C-1 | C-2 | C-3 | C-4 | C-5 | C-6 | C-7 | C-10 | C-11 |
|---|---|---|---|---|---|---|---|---|---|---|
| Acidity in watering solution | g/L | 15/20 | 15/20 | 15/20 | 15/20 | 15/20 | 15/20 | 15/20 | 15/20 | 15/20 |
| Watering rate | L/h/m² | 10 | 10 | 10 | 10 | 10 | 10 | 10 | 10 | 10 |
| Lixiviation time | days | 44 | 44 | 44 | 44 | 37 | 37 | 37 | 39 | 39 |
| Lixiviation ratio | M³/t | 2.31 | 2.22 | 2.27 | 2.31 | 1.91 | 2.01 | 1.95 | 2.0 | 1.97 |
| GRAVEL | | | | | | | | | | |
| Total Copper Grade | % | 1.11 | 1.11 | 1.24 | 1.34 | 1.64 | 1.58 | 1.63 | 1.37 | 1.44 |
| Weight loss | % | 4.42 | 4.52 | 2.46 | 3.18 | 2.69 | 2.41 | 2.36 | 4.08 | 2.7 |
| RESULTS | | | | | | | | | | |
| Metallurgical Accounting | % | 95 | 95 | 103 | 100 | 102 | 105 | 102 | 104 | 102 |
| Copper in rich solution | g/L | 8.4 | 8.7 | 11.8 | 11.6 | 8.5 | 8.1 | 8.4 | 22.7 | 23.1 |
| Copper extraction | % | 61.9 | 61.6 | 47.5 | 46.4 | 29.9 | 30.5 | 29.7 | 48.4 | 46.8 |
| Gross acid Consumption | Kg/t | 56.3 | 55.0 | 40.7 | 40.5 | 27.9 | 28.3 | 29.6 | 44.8 | 44.5 |
| Net acid consumption | Kg/t | 33.2 | 32.0 | 23.0 | 23.2 | 17.6 | 18.1 | 17.7 | 16.5 | 16.5 |

On the other hand, electrolyte solutions were prepared to be exposed to the EW process. Electrolyte was prepared for 2 experiences (P1 and P2), of which the first was of 400 L for calibration and subsequently one of 800 L for the EW test itself, to which acid was added in the levels required (150 g/L). According to the latter, the solution was characterized via EAA for Cu and FeT, Cl for volumetric analysis and multi-element analysis via ICP.

Table VI shows the chemical characterization of both electrolytes at the entrance of the EW process, while Table VII shows an analysis of the impurities of the P2 solution.

TABLE VI

| Test N° | $Cu^{++}$ (g/L) | $H^+$ (g/L) | FeT (g/L) | Cl (g/L) |
|---|---|---|---|---|
| P1 | 12.27 | 151.0 | 0.71 | 0.87 |
| P2 | 14.78 | 149.5 | 0.57 | 0.69 |

TABLE VII

| Sample | Al (g/L) | Mn (g/L) | Ca (g/L) | Mg (g/L) | Na (g/L) | K (mg/L) | $SO_4$ (g/L) |
|---|---|---|---|---|---|---|---|
| P2 | 0.62 | 0.17 | 0.42 | 0.61 | 0.42 | 47.64 | 142.53 |

On its part, Table VIII shows the multi-element composition of the PLS solutions (using potable water and seawater as a medium) before adding acid to transform it into a solution for electrowinning.

TABLE VIII

| Element | Unit | PLS Seawater | PLS Potable Water |
|---|---|---|---|
| Cu | (mg/l) | >500 | >500 |
| S | (mg/l) | >500 | >500 |
| Zn | (mg/l) | >500 | >500 |
| Na | (mg/l) | >2500 | 377 |
| Mg | (mg/l) | 1942 | 661 |
| Fe | (mg/l) | 1765 | 582 |
| Al | (mg/l) | 879 | 562 |
| Ca | (mg/l) | 468 | 456 |
| K | (mg/l) | 308 | 31 |
| Mn | (mg/l) | 283 | 207 |
| As | (mg/l) | 162 | 8.15 |
| P | (mg/l) | 149 | 16.6 |
| Ni | (mg/l) | 37.9 | 22.9 |
| Pb | (mg/l) | 23.4 | 18.8 |
| Cd | (mg/l) | 16.1 | 8.52 |
| Co | (mg/l) | 11.2 | 7.33 |
| Sr | (mg/l) | 6.32 | 1.81 |
| U | (mg/l) | 3.50 | 3.36 |
| V | (mg/l) | 3.28 | 1.51 |
| Cr | (mg/l) | 1.44 | 1.19 |
| La | (mg/l) | 1.34 | 0.90 |
| Li | (mg/l) | 1.23 | 0.72 |
| Y | (mg/l) | 1.03 | 0.81 |
| Tl | (mg/l) | 0.60 | 0.51 |
| Bi | (mg/l) | 0.58 | <0.25 |
| Ta | (mg/l) | 0.51 | <0.50 |
| Ag | (mg/l) | 0.45 | <0.05 |
| Hg | (mg/l) | 0.32 | 0.16 |
| Be | (mg/l) | 0.16 | <0.10 |
| Mo | (mg/l) | 0.14 | 0.17 |
| Zr | (mg/l) | 0.13 | <0.05 |
| Sc | (mg/l) | 0.10 | <0.05 |
| Ti | (mg/l) | <5.00 | <5.00 |
| Ba | (mg/l) | <0.50 | <0.50 |
| Nb | (mg/l) | <0.50 | <0.50 |
| Sb | (mg/l) | <0.50 | <0.50 |
| Se | (mg/l) | <0.50 | <0.50 |
| Sn | (mg/l) | <0.50 | <0.50 |
| Te | (mg/l) | <0.50 | <0.50 |
| Th | (mg/l) | <0.50 | <0.50 |
| W | (mg/l) | <0.50 | <0.50 |
| Ga | (mg/l) | <0.05 | <0.05 |

Finally, for the EW tests (2), their chemical characterization was executed by $Cu^{++}$, $H^+$, FeT and $Cl^{--}$, whose results are shown in Tables IX and X.

TABLE IX

| Test N° | Time | Cu++ (g/L) | H+ (g/L) | FeT (g/L) | Cl (g/L) |
|---|---|---|---|---|---|
| P1-0 | 16:20 | 12.27 | 151.0 | 0.71 | 0.87 |
| P1-1 | 17:20 | 12.19 | 156.05 | 0.59 | 0.92 |
| P1-2 | 18.20 | 11.63 | 152.95 | 0.68 | 1.15 |
| P1-3 | 19.20 | 10.98 | 156.70 | 0.75 | 1.26 |
| P1-4 | 20.20 | 10.33 | 157.21 | 0.78 | 0.82 |
| P1-5 | 21.20 | 9.85 | 158.40 | 0.83 | 1.26 |
| P1-6 | 22:20 | 9.37 | 158.44 | 0.86 | 0.82 |
| P1-7 | 23:20 | 8.88 | 160.42 | 0.89 | 0.82 |
| P1-8 | 00.20 | 8.56 | 161.02 | 0.92 | 1.03 |
| P1-9 | 01:20 | 8.24 | 160.92 | 0.94 | 0.92 |
| P1-10 | 02.20 | 7.75 | 160.91 | 0.97 | 1.26 |
| P1-11 | 03:20 | 7.43 | 160.86 | 1.00 | 1.15 |
| P1-12 | 04:20 | — | — | — | — |
| P1-13 | 05:20 | 7.27 | 160.57 | 1.05 | 1.26 |
| P1-14 | 06:20 | 6.78 | 160.75 | 0.97 | 1.47 |

Table X

| Test N° | Time | Cu++ (g/L) | H+ (g/L) | FeT (g/L) | Cl (g/L) |
|---|---|---|---|---|---|
| P2-0 |  | 14.78 | 149.5 | 0.57 | 0.69 |
| P2-1 | 19:10 | 13.89 | 158.6 | 0.60 | 0.76 |
| P2-2 | 21:10 | 13.37 | 157.9 | 0.61 | 0.87 |
| P2-3 | 19.20 | 10.98 | 156.70 | 0.75 | 1.26 |
| P2-4 | 22:10 | 13.37 | 158.9 | 0.64 | 0.98 |
| P2-5 | 23.10 | 13.76 | 158.3 | 0.62 | 0.64 |
| P2-6 | 0:10 | 13.11 | 159.4 | 0.64 | 0.42 |
| P2-7 | 2:10 | 12.72 | 160.6 | 0.65 | 0.64 |
| P2-8 | 00.20 | 8.56 | 162.5 | 0.62 | 0.30 |
| P2-9 | 3:10 | 12.14 | 160.0 | 0.66 | 0.87 |
| P2-10 | 4:10 | 12.07 | 162.4 | 0.63 | 0.76 |
| P2-11 | 5:10 | 11.82 | 162.0 | 0.60 | 0.64 |
| P2-12 | 6:10 | 11.37 | 161.9 | 0.65 | 0.53 |
| P2-13 | 7:10 | 11.37 | 161.7 | 0.66 | 0.87 |
| P2-14 | 8:10 | 10.53 | 162.8 | 0.60 | 0.64 |
| P2-15 | 9:10 | 9.95 | 166.2 | 0.64 | 0.42 |
| P2-16 | 10:10 | 10.14 | 170.5 | 0.63 | 0.42 |
| P2-17 | 11:10 | 10.01 | 170.0 | 0.65 | 0.53 |
| P2-18 | 12:10 | 9.82 | 170.1 | 0.65 | 0.53 |
| P2-19 | 13:10 | 9.95 | 169.4 | 0.63 | 0.60 |
| P2-20 | 14:10 | 9.56 | 166.2 | 0.61 | 0.26 |
| P2-21 | 15:10 | 9.56 | 168.6 | 0.63 | 0.60 |
| P2-22 | 16:10 | 9.11 | 167.0 | 0.62 | 0.48 |
| P2-23 | 17:10 | 8.20 | 166.6 | 0.62 | 0.55 |
| P2-24 | 18:10 | 9.04 | 172.3 | 0.60 | 0.37 |
| P2-25 | 19:10 | 8.20 | 171.1 | 0.62 | 0.48 |
| P2-26 | 20:10 | 8.01 | 172.5 | 0.63 | 0.55 |
| P2-27 | 21:10 | 8.01 | 171.9 | 0.62 | 0.60 |
| P2-28 | 22:10 | 7.81 | 173.8 | 0.64 | 0.62 |
| P2-29 | 23:10 | 7.69 | 174.9 | 0.63 | 0.50 |
| P2-30 M-1 | 23:40 | 7.43 | 177.0 | 0.63 | 0.26 |
| P2-30 M-2 | 23:40 | 7.56 | 176.0 | 0.65 | 0.60 |
| P2-30 M-3 | 23:40 | 8.11 | 177.0 | 0.62 | 0.62 |

In these tables one can clearly see that actually the concentration of the copper declined after the electrolyte solution, which is an indicator of the electrolytic deposit. In keeping with the latter, the concentration of acid increased.

The electric and volumetric variables applied in this test were the application of a current density of 250 amperes per square meter of cathode and with a flow rate of PLS per cell of 15 liters per minute per square meter of cathode.

After these experiences, two more tests, E1 and E2, were carried out that were conducted in the same way, with the difference that these tests had a duration of approximately 24 hours, and their final result was a cathode that could be detached and characterized. (As shown in FIG. 9.)

Figure 9:
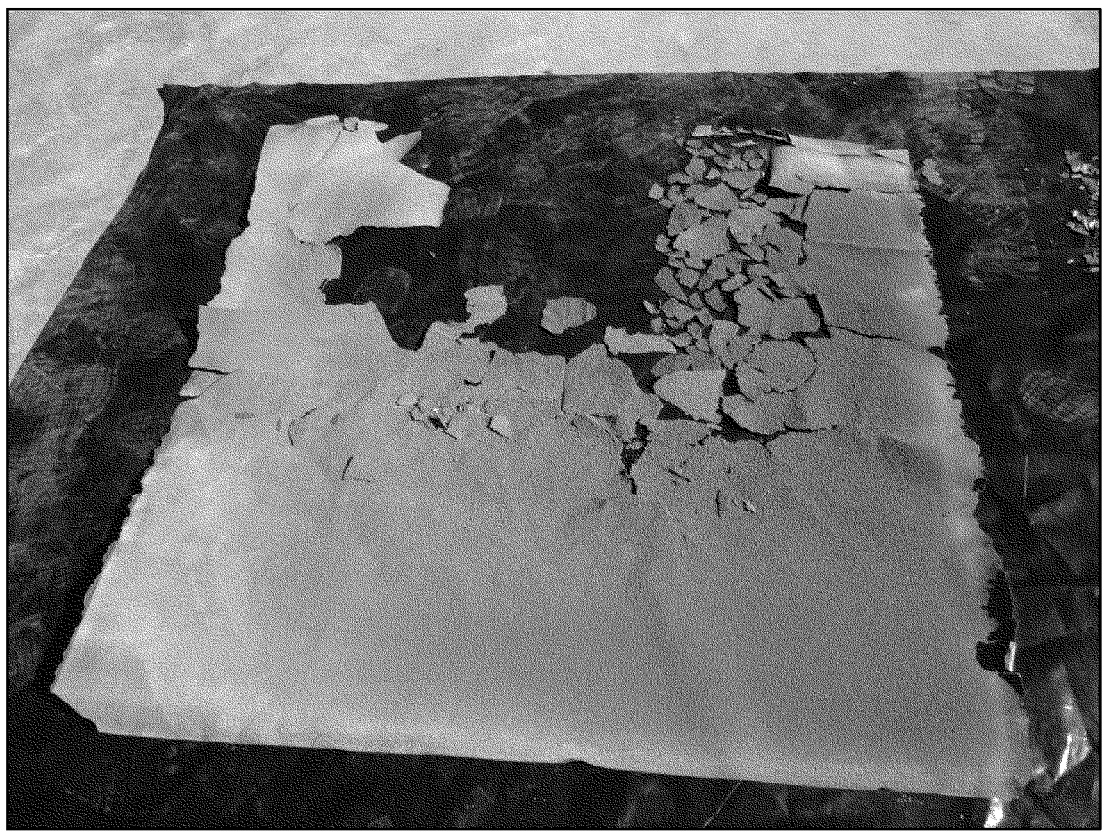

Because of the low mass, the cathode was not very thick and fell apart when it was detached, as indicated in the photograph (FIG. 9). Despite the latter, three samples were taken from the cathode, upper, middle and lower, for the respective chemical analyses, as presented in Table XI.

TABLE XI

| Element | Unit | Limit detected | High | Medium | Low |
|---|---|---|---|---|---|
| Cu | (%) | 0.1 | 99.800 | 99.810 | 99.790 |
| Cu | (%) | 0 | 99.991 | 99.983 | 99.977 |
| O | (ppm) | 2 | 216 | 210 | 142 |
| C | (ppm) | 2 | 50 | 37 | 36 |
| Cl | (ppm) | 5 | 19 | 20 | 20 |
| Pb | (ppm) | 0.5 | 15 | 107 | 169 |
| Ag | (ppm) | 1 | 6.0 | 6.0 | 6.0 |
| S | (ppm) | 2 | 3.0 | 6.0 | 6.0 |
| Ca | (ppm) | 1 | 1.0 | 1.0 | 1.0 |
| As | (ppm) | 0.1 | <0.1 | <0.1 | <0.1 |
| Bi | (ppm) | 0.1 | <0.1 | <0.1 | <0.1 |
| Sb | (ppm) | 0.1 | <0.1 | <0.1 | <0.1 |
| Se | (ppm) | 1 | <1 | <1 | <1 |
| Sn | (ppm) | 1 | <1 | <1 | <1 |
| Te | (ppm) | 1 | <1 | <1 | <1 |
| Co | (ppm) | 1 | <1 | <1 | <1 |
| Cr | (ppm) | 1 | <1 | <1 | <1 |
| Fe | (ppm) | 1 | <1 | <1 | <1 |
| Mn | (ppm) | 1 | <1 | <1 | <1 |
| Ni | (ppm) | 1 | <1 | <1 | <1 |
| Cd | (ppm) | 1 | <1 | <1 | <1 |
| Zn | (ppm) | 1 | <1 | <1 | <1 |
| P | (ppm) | 1 | <1 | <1 | <1 |
| Si | (ppm) | 5 | <5 | <5 | <5 |

Based on the results obtained (direct analysis), the purity of the cathode, determined by electrogravimetry, was an average of 99.80%; we can say that it was even as to depth, because the small difference observed could be related to an experimental error. With regard to the contaminant, principally Pb, it is clearly stratified, and its origin cannot be other than from the anode, as the PLS did not have this element in an amount to deposit equivalent to what was analyzed.

The conclusion of these tests was that starting with a low-grade ore or a PLS with initial concentrations of copper with a low marketability of between 8 and 22 g/L, if the PLS is conditioned adequately and the direct electrowinning system is operated, electrodes of top quality copper can be obtained without requiring the concentration of the copper with solvents (SX).

The final product of the EW-LED process was a cathodic copper in sheets of approximately 42 kg with an area of 1 m² and a purity equal or higher than 98%.

Example of Application 2

In a real test in a pilot plant, 83.3 tons of ore are required daily, with a size 100% below 1.27 cm and it is accumulated in a stock pile (with an autonomy of 7 days and 583 tons of reserve).

Then this material, ground and sieved, is agglomerated until it has a 10% humidity with a proportioning of sulfuric acid of 10 kg/ton, generating a flow of damp ore of 92.5 ton/day. These data can be seen in the following table XII.

TABLE XII

| | Balance of materials: Crushing and Agglomeration Design condition | Mass flow t/d | Mass Flow t/d |
|---|---|---|---|
| A | Crushed ore to Stock Pile-Agglomeration | 83.3 | 6.94 |
| B | Sulfuric Acid to Agglomeration | 0.85 | 0.07 |
| C | Process water to agglomeration | 8.40 | 0.70 |
| D | Agglomerated ore to LX | 92.5 | 7.71 |

In this process, the lixiviation is a continuous process, 24-hours a day, with an annual processing time of 358 days of ore. With a total cycle of 100 days of ore processing per pile. To be able to comply with this, a daily dry flow of ore of 83.3 ton/day is handled, with the same flow of gravel to the dump.

The real requirements of ore in the lixiviation, at the pilot plant, were the following according to table XIII

TABLE XIII

| Balance of materials: lixiviation Design condition | Solution, volume of flow M³/h (L/h) | Flow of solution t/h (kg/h) | [Cu²⁺] g/L | [H₂SO₄] (purity) g/L (%) | Number of cycles # LX [EW] |
|---|---|---|---|---|---|
| 1. Raffinate drive from EW | 30.2 | 38.6 | 5.22 | 132 | |
| 2. Raffinate available from EW (by balance) | 51.9 | 66.2 | 5.22 | 132 | 0 (*) |
| 3. Raffinate to watering | 52.4 | 63.9 | 4.66 | 132 | 0 (*) |
| 4. ILS to pool | 52.2 | 63.0 | 12.2 | 57.6 | 10 (**) |
| 5. ILS in recirculation to watering | 52.4 | 63.9 | 5.40 | 125 | 1 |
| 6. Process waters to operations | 1.93 | 1.93 | | | |
| 7. LX emergency service water | 0.03 | 0.03 | | | |
| 8. Water to mixed pool (Raffinate Sec.) | 0.48 | 0.48 | | | |
| 9. Water to ILS Pool | 0.28 | 0.28 | | | |
| 10. Sulfuric acid to operations | | 2.18 | | (98) | |
| 11. Sulfuric acid to Agglomeration | | 0.07 | | (98) | |
| 12. Sulfuric acid to ILS pool | | 0.00 | | (98) | |
| 13. Process water to EW | 1.14 | 1.14 | | | |

TABLE XIII-continued

| Balance of materials: lixiviation Design condition | Solution, volume of flow M³/h (L/h) | Flow of solution t/h (kg/h) | [Cu²⁺] g/L | [H₂SO₄] (purity) g/L (%) | Number of cycles # LX [EW] |
|---|---|---|---|---|---|
| 14. Sulfuric acid to EW | | 2.11 | | (98) | |
| 15. Evaporation Mixed Pool (Raffinate Sec.) | 0.05 | 0.05 | | | |
| 16. Evaporation ILS Pool | 0.10 | 0.10 | | | |
| 17. Evaporation Mixed Pool (PLS Sec.) | 0.05 | 0.05 | | | |
| 18. PLS to Mixed Pool (PLS Sec.) | 52.0 | 62.8 | 13.0 | 50.3 | 11 (***) |
| 19. PLS available to EW (by balance) | 51.9 | 62.7 | 13.0 | 50.4 | 11 (***) |
| 20. PLS drive to EW | 30.2 | 36.5 | 13.0 | 50.4 | 11 (***) |

(*) Fresh raffinate from EW
(**) Characterization of solution considering up to the cycle prior to final sending to EW.
(***) Characterization of solution in quality of PLS.

Once the lixiviation process and preparation of the PLS for its electrowinning have been executed, this latter process requires a continuous operation of 24 hours per day, with the same annual ore processing time of 358 days. The cathodic cycles in the EW-LED process are of 5 days, with a gathering of 42 kilograms of copper per cathode with a purity above 97%, an operational current density of 300 A/m². The PLS flow entering the bay is 30.2 m³/h, with six cycles of the volume of PLS entering the bay.

The data and characteristics for the operation of the EW-LED process are described in the following tables XIX and XX.

TABLE XIX

| Balance of materials: Electrowinning-LED Design condition | Solution, volume of flow M³/h (L/h) | Flow of solution t/h (kg/h) [t Cu/h] | [Cu²⁺] g/L | [H₂SO₄] (purity) g/L (%) | Number of cycles # LX/[EW] |
|---|---|---|---|---|---|
| 21. PLS to conditioning | 30.2 | 36.5 | | 50.4 | 101 (*) |
| 22. Sulfuric acid to line | 2.11 | (98) | | | |
| 23. Process water to line | (12.1) | (12.1) | | | |
| 24. PLS to E/E heat exchanger | 30.2 | 38.0 | 13.0 | 120 | [0] (*) |
| 25. PLS to E/A heat exchanger | 30.2 | 38.0 | 13.0 | 120 | [0] (*) |
| 26. Cobalt sulfate to Cobalt sulfate TK | | (21.6) | | | |
| 27. Guar to Guar TK | (0.01) | | | | |
| 28. Solution of cobalt sulfate | (433) | (433) | | | |
| 29. Guar solution to distribution | (1.29) | (1.29) | | | |
| 30. Guar solution to EW 1 Bank | (0.32) | (0.32) | | | |
| 31. Guar solution to EW 2 Bank | (0.32) | (0.32) | | | |
| 32. Guar solution to EW 3 Bank | (0.32) | (0.32) | | | |
| 33. Guar solution to EW 4 Bank | (0.32) | (0.32) | | | |
| 34. PLS to EW 1 Bank | 30.2 | 38.0 | 13.0 | 120 | [0] (*) |
| 35. PLS to EW 2 Bank | 30.2 | 38.0 | 12.6 | 120 | [1] |
| 36. PLS to EW 3 Bank | 30.2 | 38.0 | 12.3 | 121 | [1] |
| 37. PLS to EW 4 Bank | 30.2 | 38.0 | 12.0 | 121 | [1] |
| 38. PLS to Transfer TK | 30.2 | 38.0 | 11.7 | 122 | [1] |
| 39. PLS in recirculation to pool | 30.2 | 38.6 | 6.51 | 130 | [5] (**) |
| 40. Hot water from heater | 21.1 | 21.1 | | | |

TABLE XIX-continued

| Balance of materials: Electrowinning-LED Design condition | Solution, volume of flow M³/h (L/h) | Flow of solution t/h (kg/h) [t Cu/h] | [Cu²⁺] g/L | [H₂SO₄] (purity) g/L (%) | Number of cycles # LX/[EW] |
|---|---|---|---|---|---|
| 41. Hot water to Cobalt sulfate TK | (411) | (411) | | | |
| 42. Hot water to Guar TK | (1.27) | (1.27) | | | |

TABLE XX

| Balance of materials: Electrowinning - LED Design condition | Solution, volume of flow M³/h (L/h) | Flow of solution t/h (kg/h) [t Cu/h] | [Cu²⁺] g/L | [H₂SO₄] (purity) g/L (%) | Number of cycles # LX/ [EW] |
|---|---|---|---|---|---|
| 43. Hot water to heat exchanger | 20.2 | 20.2 | | | |
| 44. Hot water to cathode washing | 0.50 | 0.50 | | | |
| 45. Hot water runoff | 20.2 | 20.2 | | | |
| 46. Process water to services and operation | 1.13 | 1.13 | | | |
| 47. Water to EW-LED emergency service | 0.03 | 0.03 | | | |
| 48. Service water to human consumption | 0.19 | 0.19 | | | |
| 49. Process water to replenishment | 0.91 | 0.91 | | | |
| 50. Water to heater | 21.2 | 21.1 | | | |
| 51. Petroleum to heater | | 0.09 | | | |
| 52. Evaporation of water in bay | (1.00) | (1.00) | | | |
| 53. Decomposition of water in bay | (11.1) | (11.1) | | | |
| 54. Cathodic copper | | (0.04) | | | |
| 55. Discharge of Raffinate to LX | 30.2 | 38.6 | 5.22 | 132 | [6] (***) |

(*) Fresh raffinate from LX
(**) Characterization of solution considering up to the cycle prior to the final runoff to LX.
(***) Characterization of solution as raffinate.

Under the conditions described previously, copper cathodes are obtained weighing 42 kilograms, high purity, above 97%, such as those seen in application example 1.

The invention claimed is:

1. A system of electrowinning without extraction by solvents based on a pregnant leach solution (PLS) with a copper content from 5 to 30 g/L, comprising:
   rotary pumps of PLS, intermediate lixiviation solution (ILS), water, and reagents;
   a PLS accumulation tank;
   an emergency pool, mixed solution pool, and ILS pool;
   a PLS heater;
   a heat exchanger;
   modules of electrolytic cells for lixiviation with direct electrowinning (EW-LED cells);
   piping for feeding the PLS to the EW-LED cells; and
   rectifying low current transformers and instruments that permit taking a census and measuring the variables of an electrowinning process,
   wherein the PLS heater and the heat exchanger work together where the heat exchanger, using PLS/PLS plates, transfers the heat energy from the PLS and a raffinate solution leaving the EW-LED cells, towards recirculating/fresh incoming PLS, according to a PLS recirculation cycle, so as to power feedback the PLS in turn, and then thermally treat the PLS once again in the heat exchanger, using PLS/water plates operated with hot water as a heat-contributing fluid in an operation of countercurrent flows without direct contact, as in the heat energy transfer using the PLS/PLS plates, permitting maintaining a constant temperature of the PLS in a range between 20° C. and 60° C. upon entering the EW-LED cells.

2. The system of claim 1, wherein the PLS rotary pump, PLS accumulation tank, emergency pool, mixed solution pool, pool and piping for feeding the PLS to the EW-LED cells are configured to operate sequentially to pump onto dynamic pads of agglomerated material a solution of lixiviation raffinate originating from the spent solutions of the EW-LED cells and then recirculate ILS from the ILS pool, which is formed based on the ILS with a low concentration of copper, process water and also sulfuric acid from progressive enrichment of copper, via piping to the EW-LED cells as PLS that is heated and conditioned in line with the adding of additives, fresh sulfuric acid and process water, then from the EW-LED cells as a copper-poor solution towards a transfer tank, which derives the solution towards the mixed solution pool a specific number of times until the concentration of copper in the copper-poor solution from the EW-LED is lowered to a pre-established value, and thereafter derive the copper-poor discharge solution to the mixed solution pool as a raffinate solution for its re-enrichment in copper through the dynamic pads and thus returns to the electrowinning process such that continuous volumes of electrolytic solution are handled.

3. The system of claim 1, wherein the instruments that permit taking a census and measuring the variables of the electrowinning process are integrated into the system, and also permit detecting and controlling continuous current, temperature, flow rates, pH and electric conductivity.

4. The system of claim 1, wherein rectifier transformers feed and control a density of load to the EW-LED cells.

5. The system of claim 1, wherein the entire system is modular and enlargeable depending on the offer of material.

6. The system of claim 1, wherein the entire system is mobile and can be installed on site in the field.

7. The system of claim 1, wherein:
   each of the modules of EW-LED cells include between 2 to 12 compact cells, where each cell is formed by a cathode and an anode;
   the distribution of electrical connections in the cells are connected in series between cathodes and anodes and integrated, in order to maintain an identical continuous current and with an equal current density in all the modules and inter-modules;
   an operative area of the cathode is in the range of 2 to 0.3 m²;
   the current density is regulated in the module in a range between 0 and 450 amperes, with an operative current density between 150 and 300 amperes per m² of cathode; and
   piping also exists independent of the flow of PLS; and an independent control of the electric field.

8. A system of electrowinning without extraction by solvents based on a pregnant leach solution (PLS) with a copper content from 5 to 30 g/L, comprising:
- rotary pumps of PLS, intermediate lixiviation solution (ILS), water, and reagents;
- a PLS accumulation tank;
- an emergency pool, mixed solution pool, and ILS pool;
- a PLS heater;
- a heat exchanger;
- modules of electrolytic cells for lixiviation with direct electrowinning (EW-LED cells);
- piping for feeding the PLS to the EW-LED cells; and
- rectifying low current transformers and instruments that permit taking a census and measuring the variables of an electrowinning process,
- wherein the PLS rotary pump, PLS accumulation tank, emergency pool, mixed solution pool, pool and piping for feeding the PLS to the EW-LED cells are configured to operate sequentially to pump onto dynamic pads of agglomerated material a solution of lixiviation raffinate originating from the spent solutions of the EW-LED cells and then recirculate ILS from the ILS pool, which is formed based on the ILS with a low concentration of copper, process water and also sulfuric acid from progressive enrichment of copper, via piping to the EW-LED cells as PLS that is heated and conditioned in line with the adding of additives, fresh sulfuric acid and process water, then from the EW-LED cells as a copper-poor solution towards a transfer tank, which derives the solution towards the mixed solution pool a specific number of times until the concentration of copper in the copper-poor solution from the EW-LED is lowered to a pre-established value, and thereafter derive the copper-poor discharge solution to the mixed solution pool as a raffinate solution for its re-enrichment in copper through the dynamic pads and thus returns to the electrowinning process such that continuous volumes of electrolytic solution are handled.

9. The system of claim 8, wherein the instruments that permit taking a census and measuring the variables of the electrowinning process are integrated into the system, and also permit detecting and controlling continuous current, temperature, flow rates, pH and electric conductivity.

10. The system of claim 8, wherein rectifier transformers feed and control a density of load to the EW-LED cells.

11. The system of claim 8, wherein the entire system is modular and enlargeable depending on the offer of material.

12. The system of claim 8, wherein the entire system is mobile and can be installed on site in the field.

13. The system of claim 8, wherein:
- each of the modules of EW-LED cells include between 2 to 12 compact cells, where each cell is formed by a cathode and an anode;
- the distribution of electrical connections in the cells are connected in series between cathodes and anodes and integrated, in order to maintain an identical continuous current and with an equal current density in all the modules and inter-modules;
- an operative area of the cathode is in the range of 2 to 0.3 $m^2$;
- the current density is regulated in the module in a range between 0 and 450 amperes, with an operative current density between 150 and 300 amperes per $m^2$ of cathode; and
- piping also exists independent of the flow of PLS; and an independent control of the electric field.

* * * * *

UNITED STATES PATENT AND TRADEMARK OFFICE
CERTIFICATE OF CORRECTION

Page 1 of 1

PATENT NO. : 10,633,751 B2
APPLICATION NO. : 15/531360
DATED : April 28, 2020
INVENTOR(S) : Maria Angelica Melo Mundaca et al.

It is certified that error appears in the above-identified patent and that said Letters Patent is hereby corrected as shown below:

In the Specification

Column 22, approximately Line 40, TABLE XIX, "2.11" and "(98)" are in the wrong columns within the Table and should be moved over to fall under the headings 'Flow of solution' and '[$H_2SO_4$]', respectively.

Column 22, approximately Line 48, TABLE XIX, "(0.01)" is in the wrong column within the Table and should be moved over to fall under the heading 'Flow of solution'.

Signed and Sealed this
Fourteenth Day of July, 2020

Andrei Iancu
*Director of the United States Patent and Trademark Office*